United States Patent
Shah et al.

(10) Patent No.: US 11,540,185 B2
(45) Date of Patent: Dec. 27, 2022

(54) ULI CELL SELECTION PRIORITIZATION

(71) Applicant: Apple Inc., Cupertino, CA (US)

(72) Inventors: Sagar B. Shah, San Jose, CA (US); Alosious Pradeep Prabhakar, Singapore (SG); Kanuganti Rajeswar Reddy, Santa Clara, CA (US); Lakshmi N. Kavuri, Cupertino, CA (US); Li Su, San Jose, CA (US); Manish G. Vemulapalli, Milpitas, CA (US); Muthukumaran Dhanapal, Dublin, CA (US); Ozgur Ekici, Ottawa (CA); Rangakrishna Nallandigal, Santa Clara, CA (US); Sachin J. Sane, Santa Clara, CA (US); Shivani Suresh Babu, San Jose, CA (US); Sree Ram Kodali, Sunnyvale, CA (US); Srinivasan Nimmala, San Jose, CA (US); Vijay Venkataraman, San Jose, CA (US); Yifan Zhu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 17/178,121

(22) Filed: Feb. 17, 2021

(65) Prior Publication Data
US 2021/0266801 A1    Aug. 26, 2021

Related U.S. Application Data

(60) Provisional application No. 62/979,182, filed on Feb. 20, 2020.

(51) Int. Cl.
*H04W 36/00*    (2009.01)
*H04W 48/20*    (2009.01)
(Continued)

(52) U.S. Cl.
CPC ...... *H04W 36/0069* (2018.08); *H04B 17/318* (2015.01); *H04B 17/336* (2015.01);
(Continued)

(58) Field of Classification Search
None
See application file for complete search history.

(56) References Cited

U.S. PATENT DOCUMENTS

| | | |
|---|---|---|
| 10,512,037 B1 | 12/2019 | Sung et al. |
| 2013/0329639 A1 | 12/2013 | Wietfeldt et al. |

(Continued)

FOREIGN PATENT DOCUMENTS

| | | |
|---|---|---|
| CN | 109699059 A | 4/2019 |
| EP | 3528543 A1 | 8/2019 |

OTHER PUBLICATIONS

First Examination Report for DE Patent Application No. 10 2021 201 613.8; dated Oct. 12, 2021.

(Continued)

*Primary Examiner* — Kodzovi Acolatse
*Assistant Examiner* — Anindita Sen
(74) *Attorney, Agent, or Firm* — Kowert, Hood, Munyon, Rankin & Goetzel, P.C.

(57) ABSTRACT

Apparatuses, systems, and methods for a user equipment device (UE) to prioritize cells that support EN-DC over similar cells not supporting EN-DC. The UE may be configured to perform one or more measurement scans associated with cell selection and/or cell re-selection and may determine whether at least two LTE cells meet a selection criteria based on RSRP and/or SNR measurements. The UE may be configured to, in response to determining that at least two LTE cells meet the selection criteria, prioritize a first LTE cell of the at least two LTE cells over a second LTE cell of the at least two LTE cells based, at least in part, on support (Continued)

EN-DC. The first LTE cell may indicate support of EN-DC, e.g., via a ULI IE included in a SIB2 broadcast by the first LTE cell. The UE may be configured to select the first LTE cell for camping.

20 Claims, 17 Drawing Sheets

(51) Int. Cl.
| | |
|---|---|
| *H04W 8/24* | (2009.01) |
| *H04L 27/26* | (2006.01) |
| *H04B 17/318* | (2015.01) |
| *H04B 17/336* | (2015.01) |
| *H04W 76/27* | (2018.01) |
| *H04W 24/10* | (2009.01) |

(52) U.S. Cl.
CPC ....... *H04L 27/26025* (2021.01); *H04W 8/245* (2013.01); *H04W 24/10* (2013.01); *H04W 36/0058* (2018.08); *H04W 48/20* (2013.01); *H04W 76/27* (2018.02)

(56) References Cited

U.S. PATENT DOCUMENTS

| | | |
|---|---|---|
| 2017/0055164 A1 | 2/2017 | Santhanam et al. |
| 2018/0007673 A1 | 1/2018 | Fwu et al. |
| 2019/0069205 A1 | 2/2019 | Lee et al. |
| 2019/0223091 A1* | 7/2019 | Huang-Fu ......... H04W 72/1236 |
| 2019/0373523 A1 | 12/2019 | Panchal et al. |
| 2020/0037387 A1 | 1/2020 | Lee et al. |
| 2020/0077325 A1* | 3/2020 | Jangid ................ H04W 48/20 |
| 2020/0100151 A1* | 3/2020 | Kumar ............. H04W 36/0055 |
| 2020/0145967 A1 | 5/2020 | Park et al. |
| 2020/0252838 A1* | 8/2020 | Akdeniz ............. H04W 64/006 |
| 2020/0267585 A1* | 8/2020 | Menon ................ H04W 68/02 |
| 2021/0076270 A1* | 3/2021 | Sreenivasa ........ H04W 36/0085 |
| 2021/0136852 A1* | 5/2021 | Zhao .................... H04W 48/02 |
| 2022/0030442 A1* | 1/2022 | Laghate ................ H04W 76/15 |
| 2022/0141885 A1* | 5/2022 | Shreevastav .......... H04L 5/0053 |
| | | 370/329 |
| 2022/0167262 A1* | 5/2022 | Ding ....................... H04W 8/20 |

OTHER PUBLICATIONS

First Examination Report for Indian Patent Application No. 202114006893; 8 pages; dated Jan. 24, 2022.

* cited by examiner

ULI CELL SELECTION PRIORITIZATION

PRIORITY DATA

This application claims benefit of priority to U.S. Provisional Application Ser. No. 62/979,182, titled "ULI Cell Selection Prioritization", filed Feb. 20, 2020, which is hereby incorporated by reference in its entirety as though fully and completely set forth herein.

FIELD

The present application relates to wireless devices, and more particularly to apparatuses, systems, and methods for prioritizing cells that support EN-DC over similar cells not supporting EN-DC.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR provides a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods for prioritizing cells that support EN-DC over similar cells not supporting EN-DC. In some embodiments, a wireless device, e.g., such as a user equipment device (UE), may be configured to perform various methods to identify and prioritize cells that support EN-DC over similar cells not supporting EN-DC.

For example, a UE may be configured to perform one or more measurement scans associated with cell selection and/or cell re-selection and may determine whether at least two Long Term Evolution (LTE) cells meet a selection criteria based on reference signal received power (RSRP) and/or a signal to noise ratio (SNR) measurements. The UE may be configured to, in response to determining that at least two LTE cells meet the selection criteria, prioritize a first LTE cell of the at least two LTE cells over a second LTE cell of the at least two LTE cells based, at least in part, on support of Evolved Universal Terrestrial Radio Access (E-UTRA)—New Radio (NR) dual connectivity (EN-DC). In some embodiments, the first LTE cell may indicate support of EN-DC, e.g., via an upper layer indication (ULI) information element (IE) included in a SIB2 broadcast by the first LTE cell. Additionally, the first LTE cell may be configured with NR neighbors included in SIB broadcast. The UE may be configured to select the first LTE cell, e.g., for camping, based, at least in part, on the first LTE cell supporting EN-DC.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
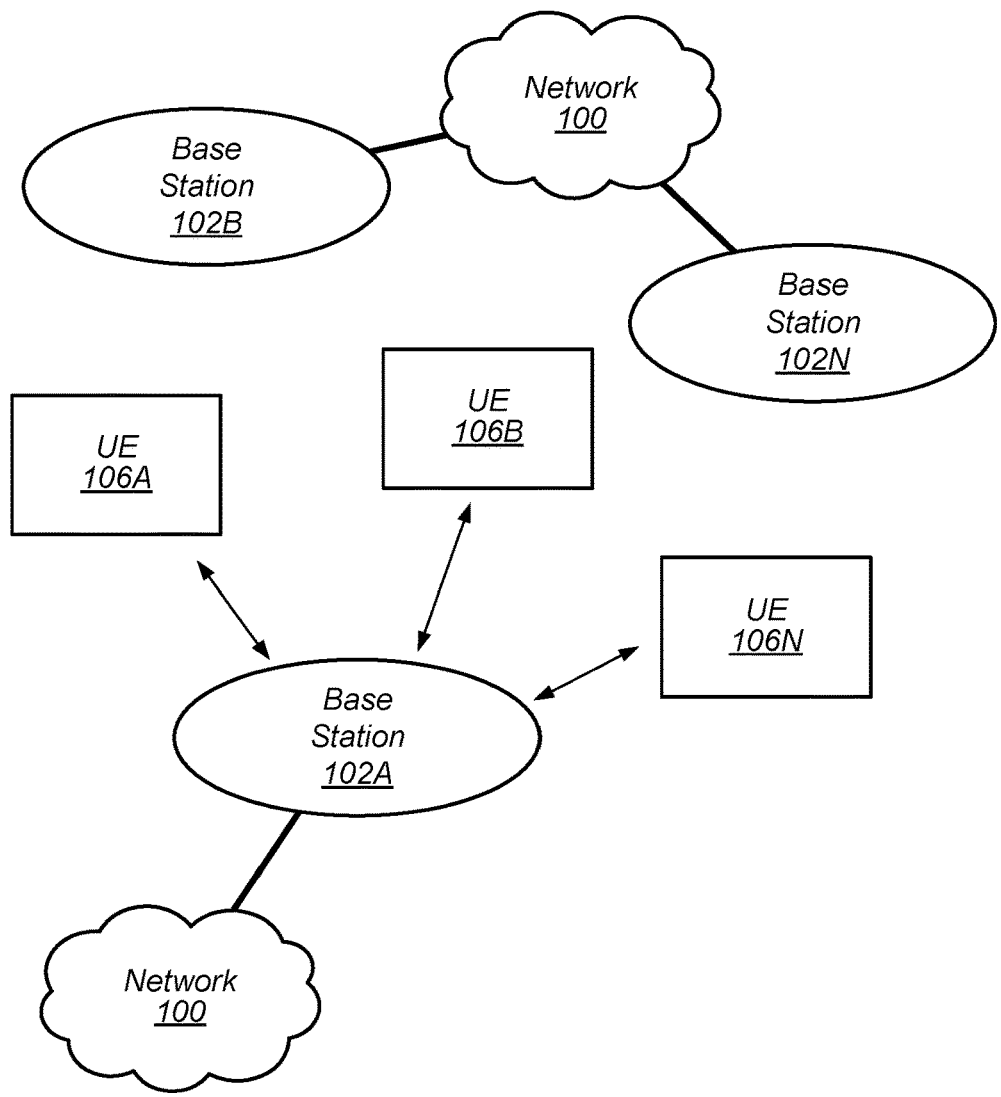
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
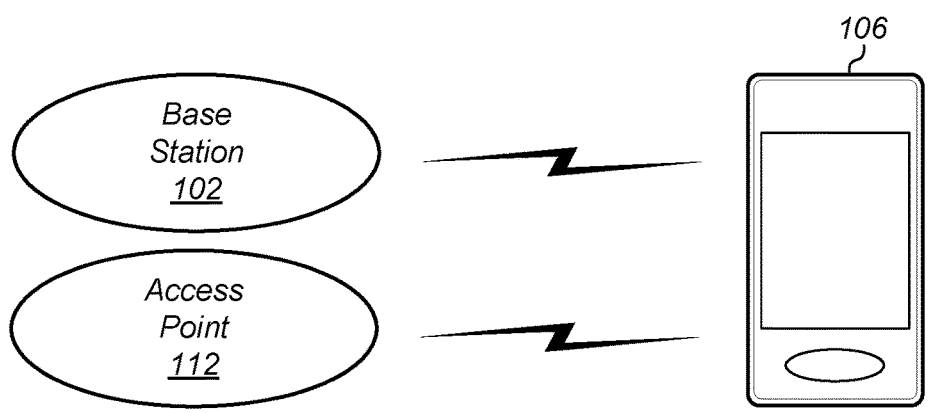
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
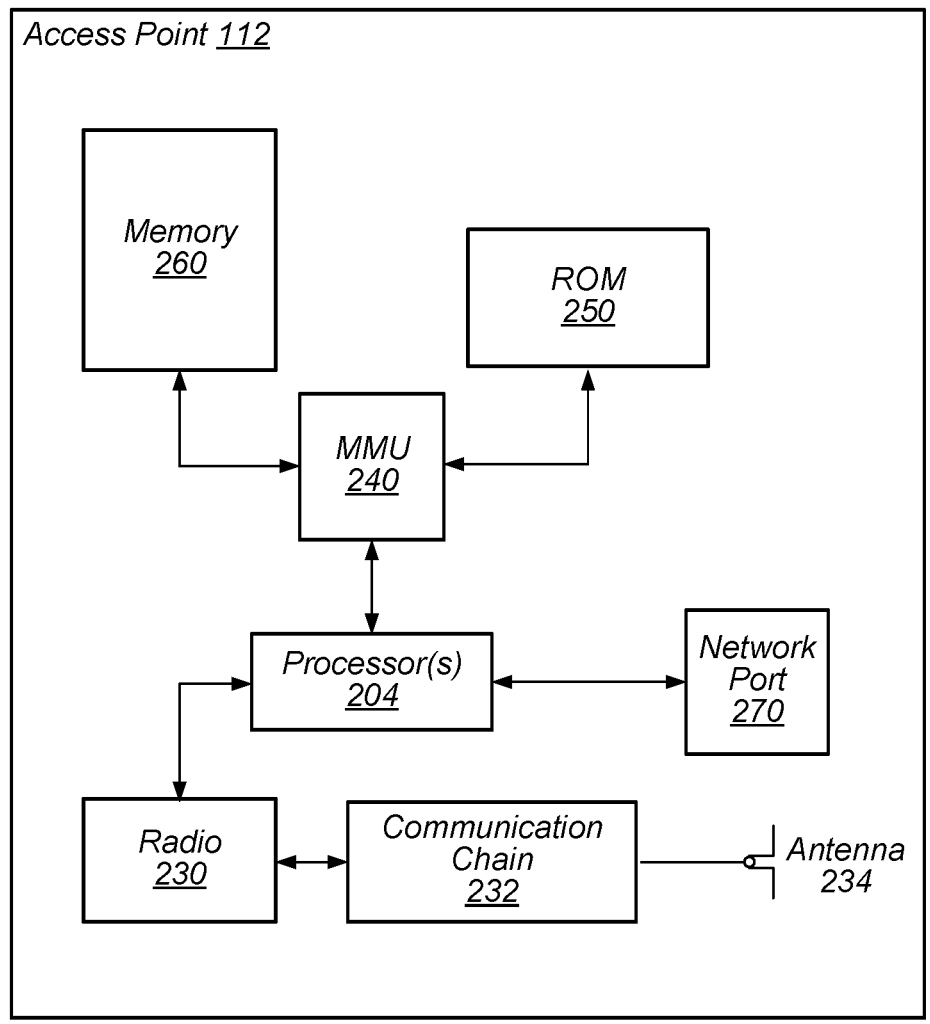
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for prioritizing cells that support EN-DC over similar cells not supporting EN-DC as further described herein.

Figure 3:
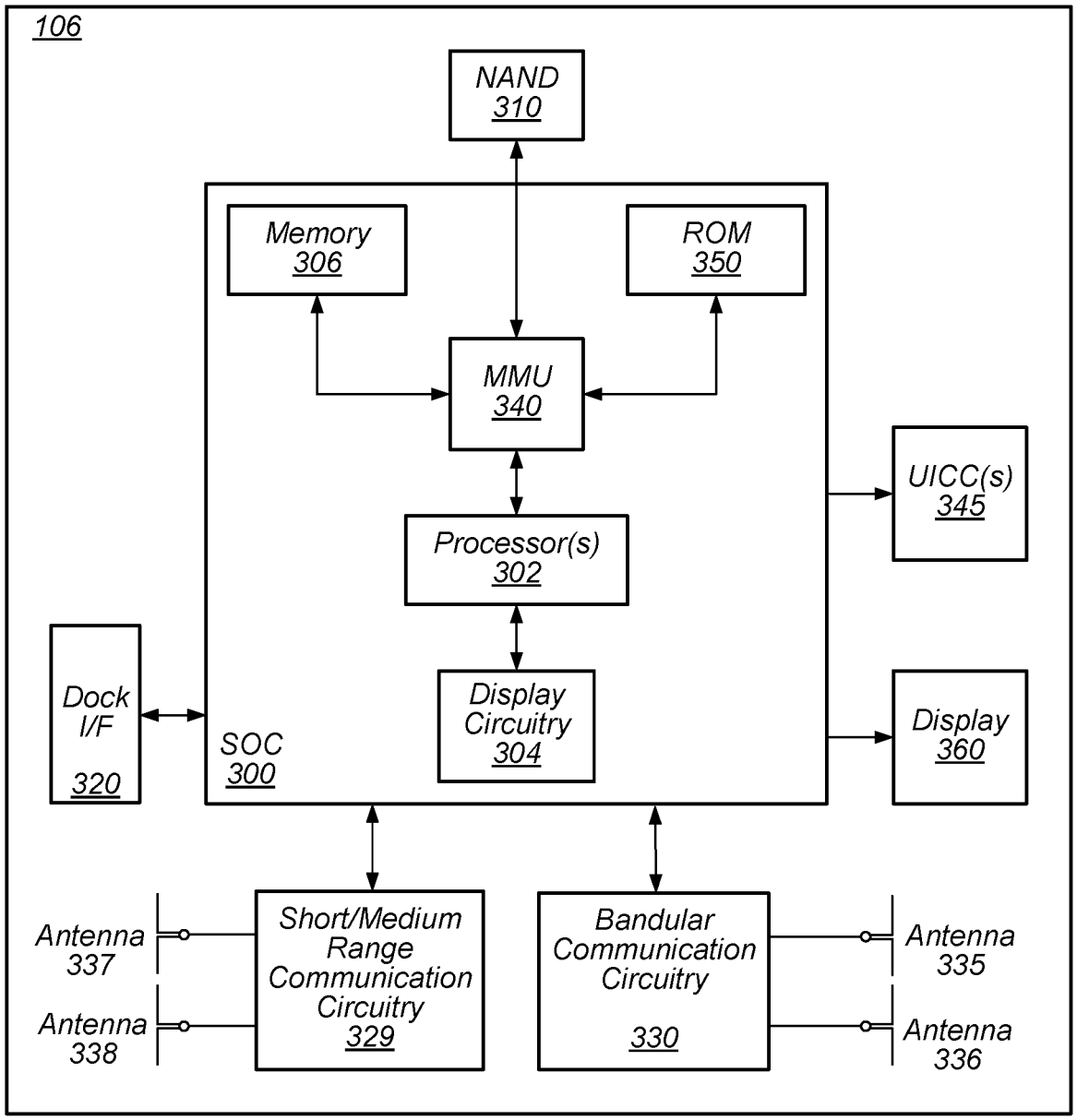
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMS 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMS, two removable SIMS, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for prioritizing cells that support EN-DC over similar cells not supporting EN-DC as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
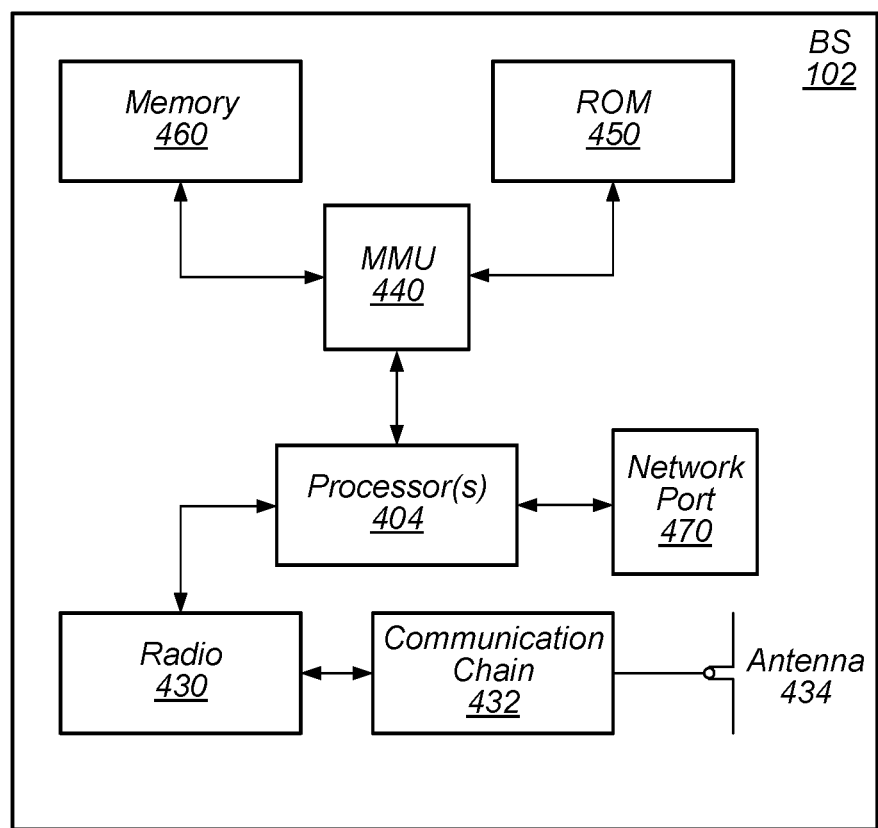
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
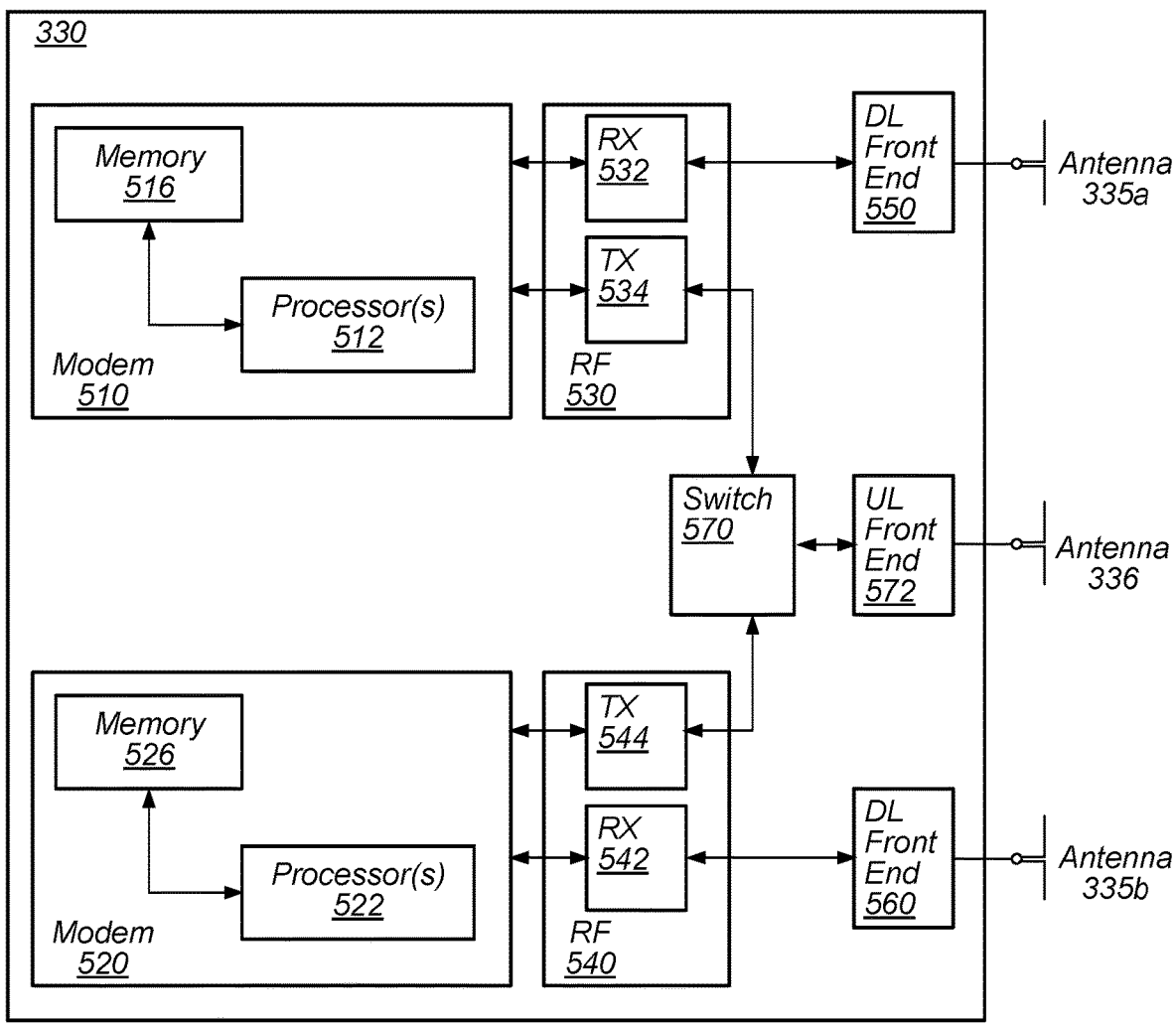
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for prioritizing cells that support EN-DC over similar cells not supporting EN-DC as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
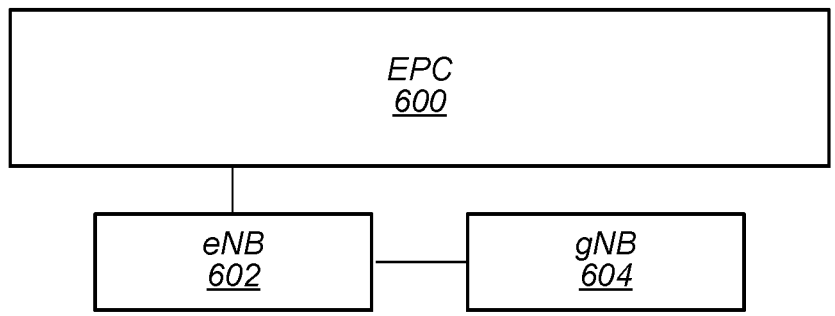
FIG. 6A illustrates an example of connections between an EPC network, an LTE base station (eNB), and a 5G NR base station (gNB).
Figure 6B:
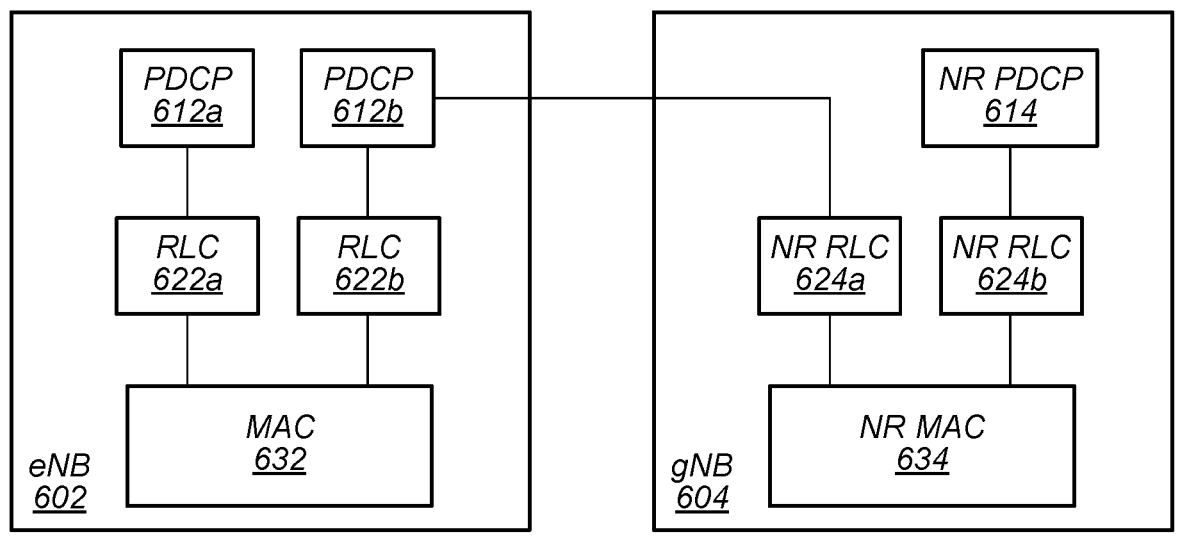
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
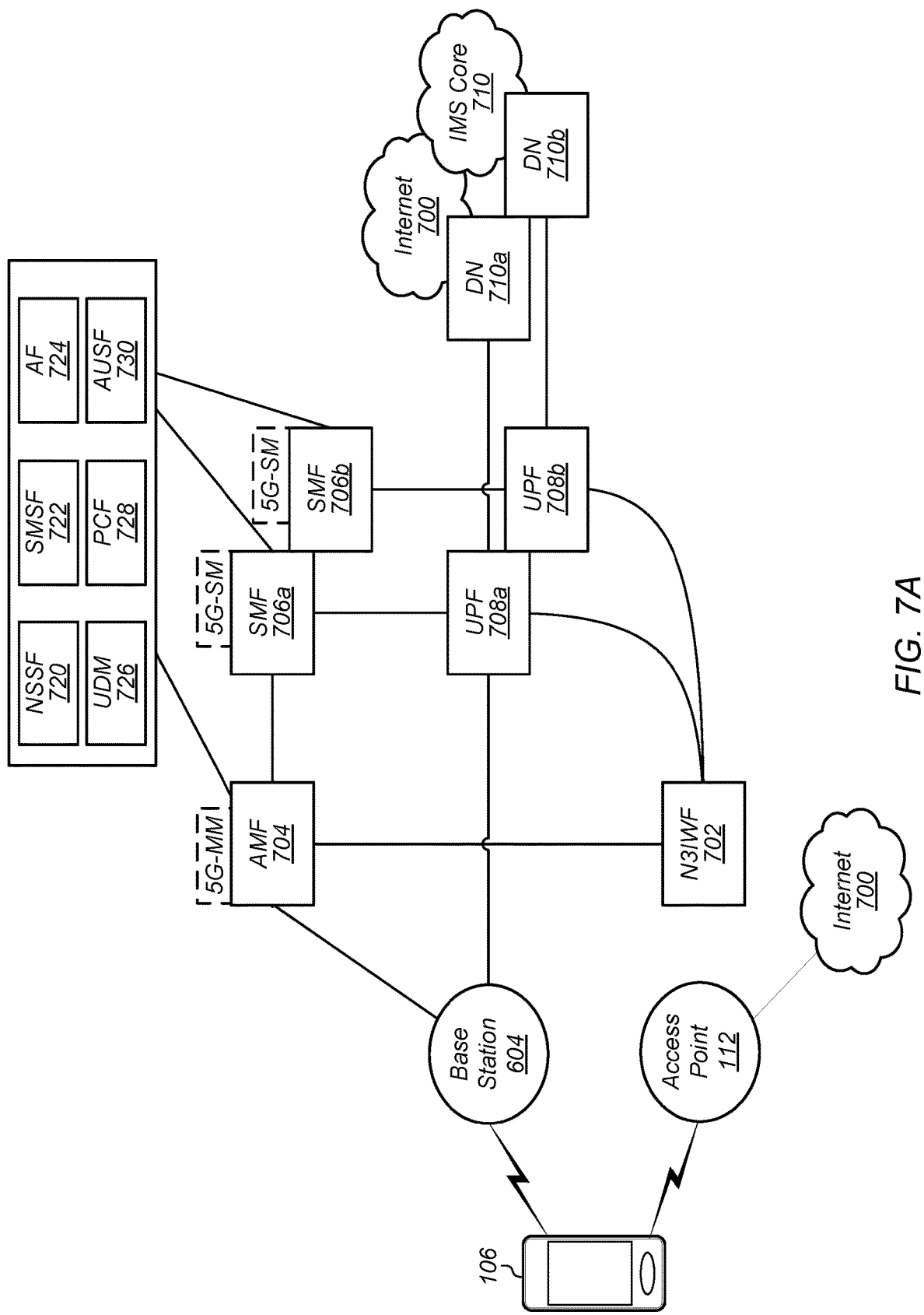
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
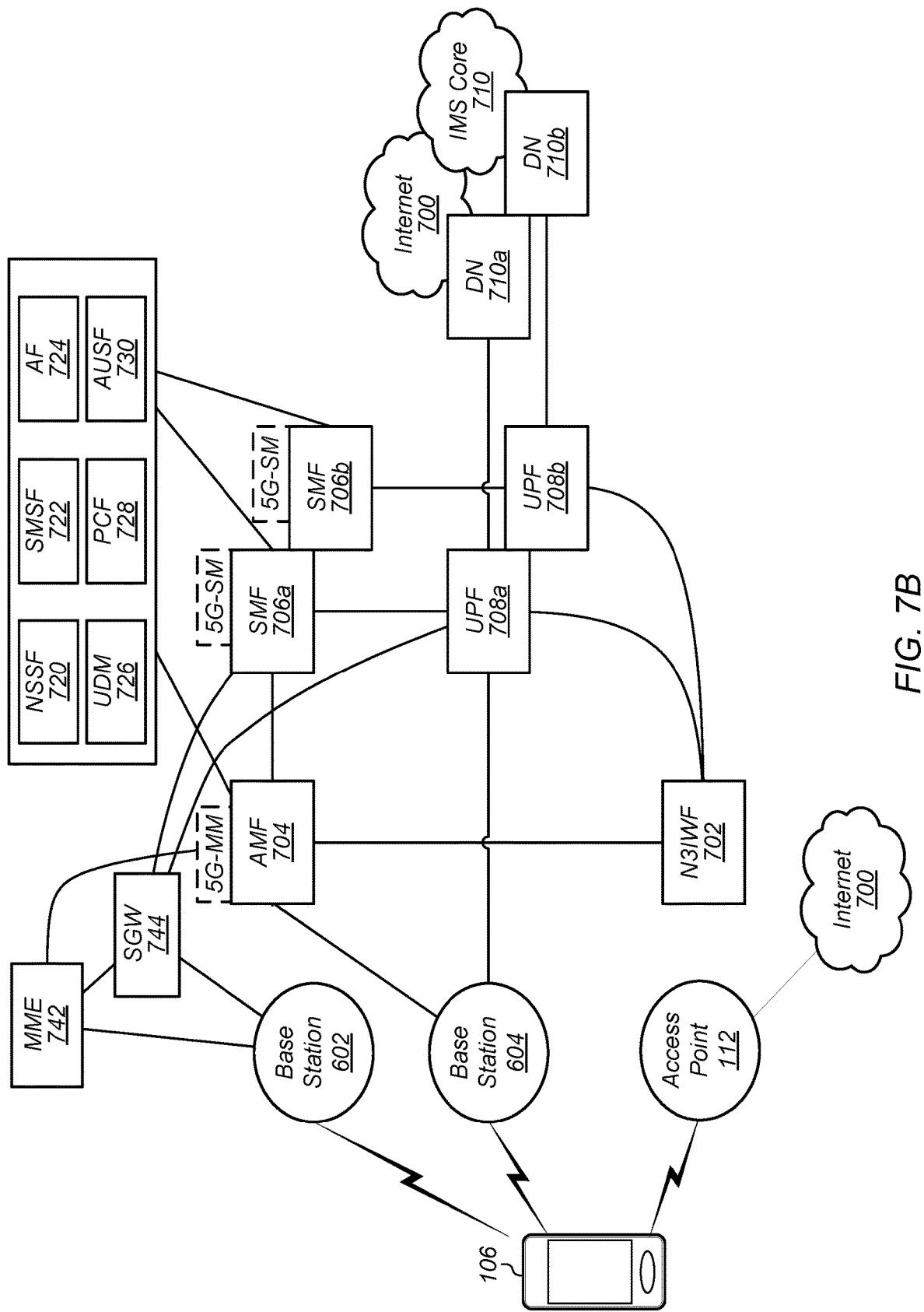
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms for prioritizing cells that support EN-DC over similar cells not supporting EN-DC, e.g., as further described herein.

Figure 8:
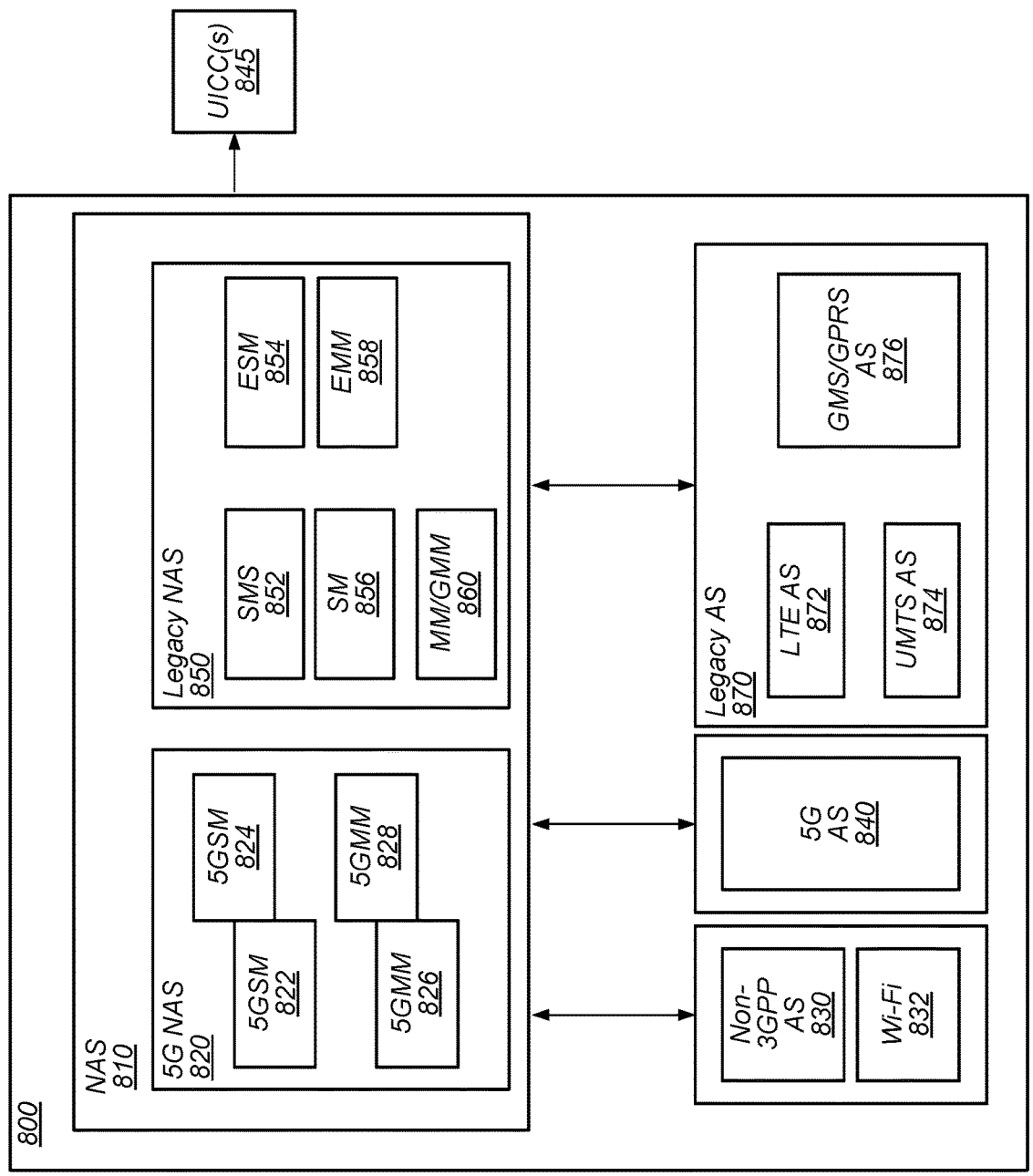
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for prioritizing cells that support EN-DC over similar cells not supporting EN-DC, e.g., as further described herein.

ULI for Cell Selection Prioritization

In current implementations, a mobile station, such as a user equipment device (UE), may receive various system information blocks (SIBs) from a cell, such as an LTE cell. A type 1 SIB (e.g., SIB1) may include cell access related information and may be transmitted from the network to the UE through PDSCH channels. A type 2 SIB (e.g., SIB2) may include radio resource configuration information that is common for all UEs, including access class barring configuration, RACH related configuration, timers, uplink power control, sounding reference signal configuration and so forth and may also be transmitted from the network to UE through PDSCH channels. A type 3 SIB (e.g., SIB3) may include common information for intra-frequency, inter-frequency and inter-technology cell re-selection parameters and may also be transmitted from the network to UE through PDSCH channels. In some implementations, a SIB2 may include a 5G NR status indicator, such as an 'upperLayerIndication" (ULI) parameter or "upperLayerIndication-r15", e.g., as defined by 3GPP TS 36.331 V15.0.0. In some implementations, a separate instance can be broadcast for each PLMN identity associated with the LTE cell. The ULI may indicate to upper layers of a protocol stack that a 5G NR cell is co-located with the LTE cell broadcasting the SIB2. In some implementations, the ULI parameter may be set to true or may otherwise be missing.

Embodiments described herein provide systems, mechanisms, and methods for ULI assisted public land mobile network (PLMN) search, e.g., to identify and/or prioritize EN-DC capable PLMNs, e.g., E-UTRA-NR dual connectivity that was introduced in 3GPP release 15 and allows mobile devices to exchange data between itself and an NR base station along with simultaneous connection with an LTE base station. In some embodiments, a ULI parameter (and/or ULI parameters) may be used by non-access stratum (NAS) layers to enhance a UE's, such as UE 106's, PLMN search in various scenarios, such as a circle border scenario, a same priority scenario, and/or to aid user selection of a PLMN.

For example, in a circle border scenario, a high priority PLMN (HP-PLMN) scan of a different carrier circle may be performed if one of the circles supports EN-DC and the current registered one does not support EN-DC. For example, when one circle supports EN-DC while a registered PLMN (R-PLMN) circle does not, then an HP-PLMN scan may be attempted to find the better circle, e.g., the circle with EN-DC support. In some embodiments, the search may be further enhanced such that, an HP-PLMN scan may be attempted only if (when) a database maintained internally in the device (e.g. in non-volatile memory) and/or a device manufacturer owned crowd sourced database downloaded on the device, indicates EN-DC capability in another circle. In some embodiments, whether a circle supports dual connectivity with NR support (DC-NR) may also be taken into account. e.g., if the R-PLMN has DC-NR set to 1 in the above case, only then attempt HP-PLMN scan. In some embodiments, when mobile operators (e.g., mobile carriers) use a "same priority" operator PLMN (e.g., a PLMN priority set by a mobile operator), then an indication via the ULI parameter that a cell includes EN-DC capability can be used as a "tie-breaker" between cells with the same priority, e.g., if one cell supports EN-DC and another cell does not, the cell supporting EN-DC may be prioritized over the cell not supporting EN-DC. In some embodiments, when displaying a random PLMN portion of a manual PLMN list on a user interface (e.g., after Equivalent Home PLMN and operator PLMN), an EN-DC capable network may be prioritized over non EN-DC capable networks.

In some embodiments, during an initial cell selection procedure performed by a UE, such as UE 106, a radio resource control (RRC) may change the cell selection threshold/evaluation as follows:

a) if/when multiple cells are found during a cell selection procedure and if only some of those cells supports EN-DC (e.g., as indicated by a ULI parameter included in SIB2), then a UE may attempt to prioritize cell selection procedure on the cells which indicate the support of EN-DC, e.g., if/when the cell is within tolerance threshold (e.g., "x" dB) of the cell with a highest reference signal received power (RSRP) and/or a highest signal to noise ratio (SNR) as measured by the UE;

b) whenever a UE camps on a cell which has broadcast an UpperLayerInd information element (IE), the UE may store this information in a database, such as an ACQ DB/APACS DB and may use the same information when it prepares the list of candidate cells during an SLS procedure (user frequency scan);

c) cell selection criteria for an EN-DC device may be a function of regular cell selection criteria+X*support of EN-DC (e.g., as indicated by inclusion of an UpperLayerInd IE in SIB2) and where X is a bias factor that may, in some embodiments, be configurable in the UE.

In some embodiments, within a list of prioritized cells which support EN-DC, a UE may use existing mechanisms to choose the cell to camp on (e.g. strongest cell based on channel/signal measurements. In some embodiments. when a reselection timer is about to expire for multiple candidate neighboring cells having approximately same energy, and in order to break a tie, ULI can may be used to prefer a neighbor cell which included ULI in SIB2 broadcast. Note that a candidate cell may be required to be better (e.g., higher RSRP and/or higher SNR as measured by the UE) than the serving cell during a time period defined by the reselection timer and more than one second has passed since the UE camped on the current serving cell.

As described above, in EN-DC, LTE is the master cell group (MCG) while NR is the secondary cell group (SCG). Thus, a UE, such as UE 106 may maintain a list/database (e.g., a table and/or look-up table) of all LTE bands, different PLMNs available and belonging to a home PLMN, as well as their corresponding EN-DC support. In some embodiments, such a list/database (e.g., an EN-DC_db) may be updated such that the last 10 camped on cells/bands/PLMNs may be contained within the database. Additionally, in some embodiments, a UE, such as UE 106, may avoid an S-criteria to reselect if a target cell(s) does not support EN-DC (e.g., as indicated by a ULI information element (IE) missing from SIB2 broadcast). Instead, the UE may prefer to stay in the current cell/band/PLMN which supports EN-DC (e.g. as indicated by a ULI IE included in SIB2 broadcast) provided RSRP of serving cell is better than a specified threshold, e.g., such −110 dBm. In some embodiments, assuming an EN-DC_db has at two entries with both cells having ULI and UE has to reselect to one of these cells, the UE may add an additional level of prioritization, e.g., based on NR cells the UE has previously camped on. For example, from the NR cells, the UE may populate the EN-DC_db with factors (details) such as FR1/FR2/SCS/BW and so forth. Then, based on these factors, the UE may determine a preferred LTE cell to stay on and/or reselect to, e.g., such as an LTE cell supporting EN-DC with FR1 range NR neighbor cell.

In some embodiments, e.g., such as when a UE, such as UE 106, is operating in non-stand-alone (NSA) mode and in an RRC-connected state, if (when) the UE has any stored version of information about target cells, the UE may take into account (consider) whether a particular LTE cell has an NR cell anchored to it (e.g., such that the LTE cell may support EN-DC) based on a ULI SIB2 parameter from any stored version of SIB2 received from LTE cells in addition to the UE's cell measurements (e.g., RSRP, SNR). In such embodiments, the UE may prioritize such LTE cells over other LTE cells that do not have any NR cells in its coverage circle (e.g., also based on SIB2s received from those LTE cells). Further, in some embodiments, the UE may report event A3 for such a prioritized LTE cell if it the prioritized LTE cell is within a minimum threshold of a cell with a highest RSRP and/or SNR as measured by the UE. In some embodiments, the minimum threshold may be an absolute threshold, e.g., such as 3 dB, among other values. In some embodiments, the minimum threshold may be a percentage threshold, e.g., such as within 1%, 5%, or 10%, among other values, of the highest RSRP and/or SNR as measured by the UE.

In some embodiments, e.g., such as when a UE, such as UE 106, is operating in non-stand-alone (NSA) mode and in an RRC-connected state, the UE may maintain a list (e.g., database) of all LTE bands, different PLMNs available belonging to the home PLMN and their corresponding ULI support. In some embodiments, the list (e.g., database may be updated to the last 10 camped cells/bands/PLMNs).

In some embodiments, e.g., such as when a UE, such as UE 106, is operating in non-stand-alone (NSA) mode and in an RRC-connected state while in a cell with LTE+NR (e.g., EN-DC) is active and the UE experiences a radio link failure (RLF) in the MCG, the UE may perform a system selection procedure to find a highest energy cell to re-establish a connection to the MCG (e.g., to send RRCReestablishment request). In some embodiments, if more than once cell is found by the UE and the cells belong to different bands or PLMNs, the UE may select the cell which supports NR (e.g., EN-DC).

In some embodiments, such mechanisms may aid in accessing high data rate, low latency 5G-NR systems and may result in an overall higher percentage of time on LTE+5G NR as compared to LTE only in mobility scenarios. In some embodiments, the network configuration may determine when the SCG is actually added, however such mechanisms may maximize chances that the UE is attached to an LTE cell that has an NR cell anchored to it in an overlapping LTE cell coverage.

In some embodiments, a UE, such as UE 106 may be operating in 5G NR stand-alone mode and may be moving to LTE coverage (e.g., downgrading radio access technology). In such embodiments, during iRAT reselection, the UE may perform measurements and discover multiple LTE cells. In some embodiments, the UE may prioritize an LTE cell which has an upper layer indication parameter (e.g., UpperLayerindication) set to "True" in a SIB2 over an LTE cell which does not include an upper layer indication parameter in a SIB2 and/or has the upper layer indication parameter set to "False". In such embodiments, the UE may benefit from LTE+NR data speeds in cases when UE has not reselected back to 5G NR (e.g., stand-alone mode).

In some embodiments, a UE, such as UE 106 may store a sub-carrier spacing (SCS) as part of a cell harvesting procedure in an internal database. In some embodiments, the internal database may further be uploaded to a device manufacturer owned server which serves as a crowd sourced database. In some embodiments, the UE may fetch this crowd sourced database opportunistically (e.g. over Wi-Fi or another non-cellular interface). Thus, during cell selection procedure, the UE may also retrieve the SCS of the cell from the database and may use the SCS for cell selection and/or cell re-selection procedures. For example, if the UE encounters a cell which has multiple SCS, then UE has to select a particular SCS from that cell and initiate the camping process. In such instances, the UE's selection of SCS may be based on:

a. a type and latency of application that is requesting an RRC connection; and/or b. whether a motive of the cell selection is to camp on a cell for reachability purpose (e.g., then the UE may pick a small SCS) as compared to camping on a cell for higher throughput purposes.

In some embodiments, a UE, such as UE 106, may receive an indication from a network (e.g., base station 102) regarding whether the NR deployment is a Frequency Range 1 (FR1) (e.g., sub 6 GHz frequency bands, including 410 MHz to 7125 MHz) or Frequency Range 2 (FR2) (e.g., frequency bands from 24.25 GHz to 52.6 GHz) deployment via a SIB2 ULI. In such embodiments, the UE may enhance cell selection and/or re-selection (e.g., when camping criterion match) based on the SIB2 ULI (NR FR1 vs NR FR2). In some embodiments, it may be advantageous (and/or beneficial) for the UE to operate in LTE+NR FR1. For example, in cases (instances) in which thermal conditions (e.g., possibility of UE overheating and/or possibility of the UE being required to reduce performance to avoid overheating) may be a concern, operating in LTE+NR FR1 may provide better (thermal) performance for the UE as compared to operating in LTE+NR FR2. In some embodiments, it may be advantageous (and/or beneficial) for the UE to operate in LTE+NR FR2. For example, in cases (instances) in which higher throughput (e.g., via ultra-wideband (UWB) support) may be required and/or desirable, operating in LTE+NR FR2 may provide better (throughput) performance as for the UE as compare to operating in LTE+NR FR1.

Figure 9:
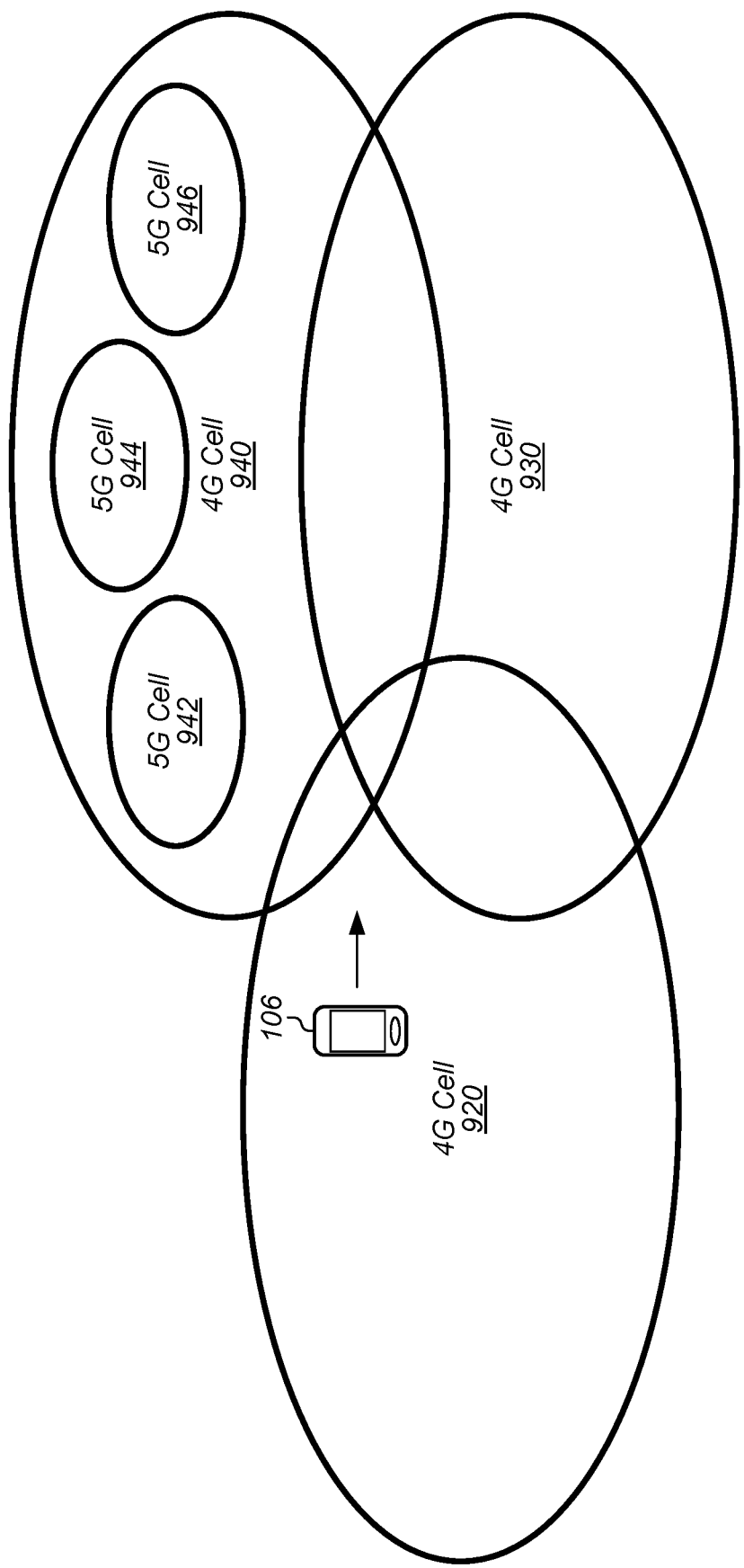
FIG. 9 illustrates an example UE mobility scenario, according to some embodiments.

FIG. 9 illustrates an example UE mobility scenario according to some embodiments. As shown, a UE, such UE 106, may be anchored in a first cell, such as 4G cell 920. The 4G cell 420 may include one or more base stations that may support a fourth generation (4G) radio access technology (RAT) such as Long Term Evolution (LTE). The UE 106 may be approaching a boundary of 4G cell 920 and, as such, may be approaching additional 4G cells 930 and/or 940. As shown, 4G cell 940 may anchor one or more 5G cells, such as cells 942-946. In other words, 4G cell 940 may support EN-DC via 5G cells 942-946. Thus, as UE 106 approaches the cell boundaries of 4G cells 930 and 940, the UE 106 may receive SIB2 messages from both 4G cells. As described above, 4G cell 940 may include an upper layer indication parameter set to "true" to indicate support of EN-DC and/or to indicate availability of 5G NR support within 4G cell 940. Additionally, 4G cell 930 may not include an upper layer indication parameter thereby indicating a lack of support of EN-DC within 4G cell 930 and/or may include an upper layer indication parameter set to "false" to indicate no support of EN-DC within 4G cell 930. Thus, in addition to the UE 106 measuring radio conditions (e.g., such as RSRP and/or SNR), the UE 106 may consider that 4G cell 940 has 5G cells 942-946 anchored to it. In some embodiments, based on the upper layer indication included in the SIB broadcast from 4G cell 940, the UE 106 may prioritize 4G cell 940 over 4G cell 930, e.g., when radio condition measurements of the cells are within a specified percentage of one another and/or when radio condition measurements of 4G cell 940 are within a specified range of radio condition measurements of 4G cell 930.

FIGS. 10-13 illustrate examples of flow diagrams for a UE, such as UE 106, for cell selection/re-selection with EN-DC cell prioritization, according to some embodiments. The methods shown in FIGS. 10-13 may be used in conjunction with any of the systems, methods, or devices shown in the Figures, among other devices.

Figure 10:
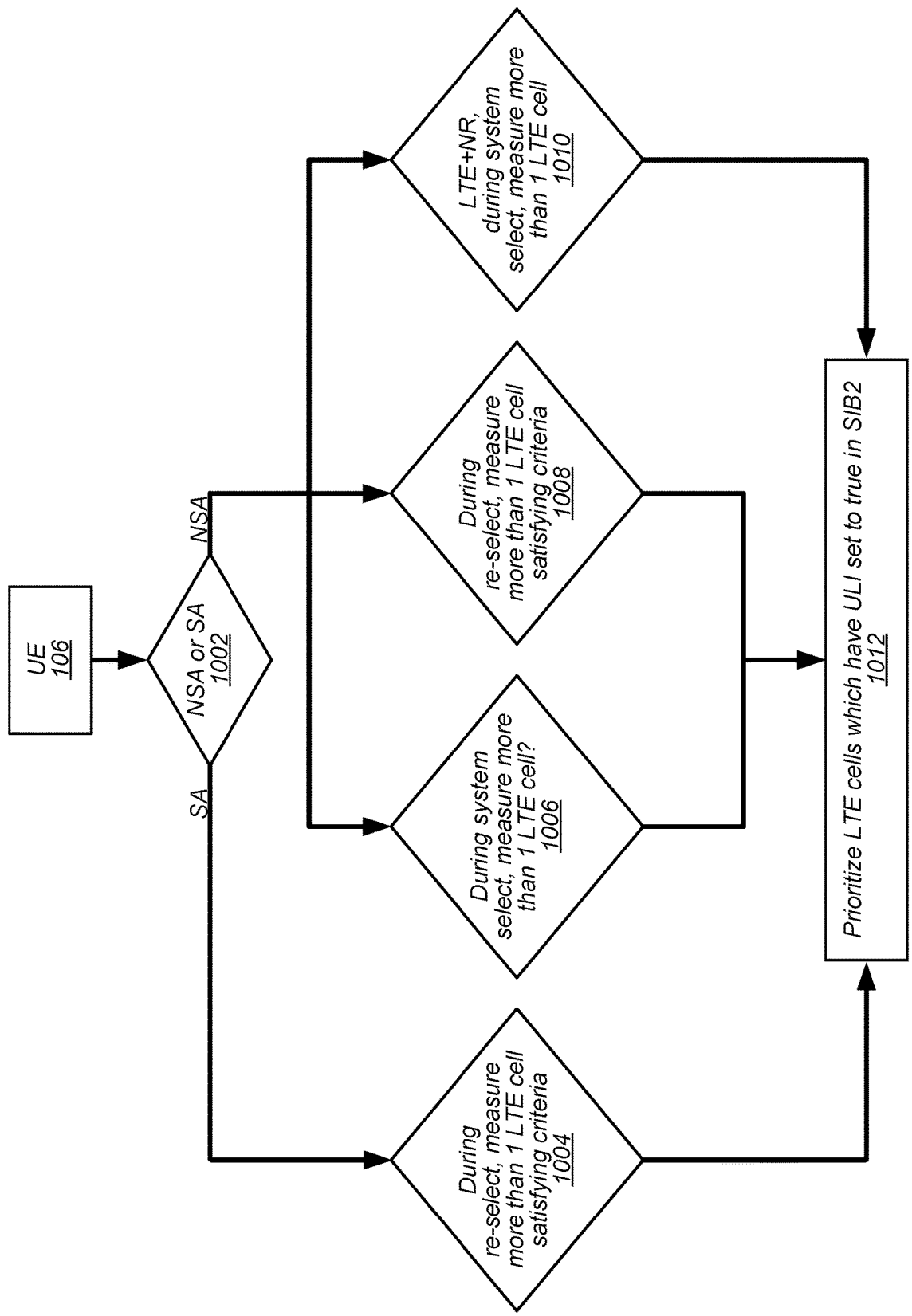
FIGS. 10-15 illustrate examples of flow diagrams for a UE, such as UE 106, for cell selection/re-selection with EN-DC cell prioritization, according to some embodiments.

For example, FIG. 10 illustrates an example of a flow diagram for a UE to prioritize cells based on an upper layer indication received for at least one of the cells, according to some embodiments. As noted, the method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, a UE, such as UE 106 may determine whether it is operating in stand-alone (SA) or non-stand-alone (NSA) mode. In other words, a 5G NR capable UE may determine whether it is attached to a 5G NR cell only or whether it is attached to a 4G LTE cell that includes 5G NR cells anchored to it, e.g., EN-DC.

At 1004, when the UE determines it is operating in stand-alone mode and during reselection to an LTE cell (e.g., from a 5G cell to a 4G cell), the UE may determine whether more than one LTE cells measured satisfy a reselection criteria, e.g., such as an S-criteria.

Alternatively, when the UE determines it is operating in a non-stand-alone mode, the UE may perform a variety of actions, e.g., depending on a status and/or condition of the UE. For example, at 1006, during system selection, the UE may determine whether more than one LTE cell is available (e.g., determine whether the UE has measured more than one LTE cell). As another example, at 1008, during cell reselection, the UE, the UE may determine whether more than one LTE cell measured satisfies a reselection criteria, e.g., such as an S-criteria. As a further example, when LTE and NR are active and the UE experiences a radio link failure in LTE, the UE may determine whether more than one LTE cell is available (e.g., determine whether the UE has measured more than one LTE cell).

At 1012, in response to determining more than one LTE cell is available, e.g., at any of method elements 1004-1010, the UE may prioritize LTE cells in which an upper layer indication parameter has been set to "true" in SIB2s received from the LTE cells. In other words, the UE may prioritize selection of LTE cells that indicate 5G NR support (e.g., via the upper layer indication parameter in a broadcasted SIB2) over LTE cells that do not indicate 5G NR support.

Figure 11:
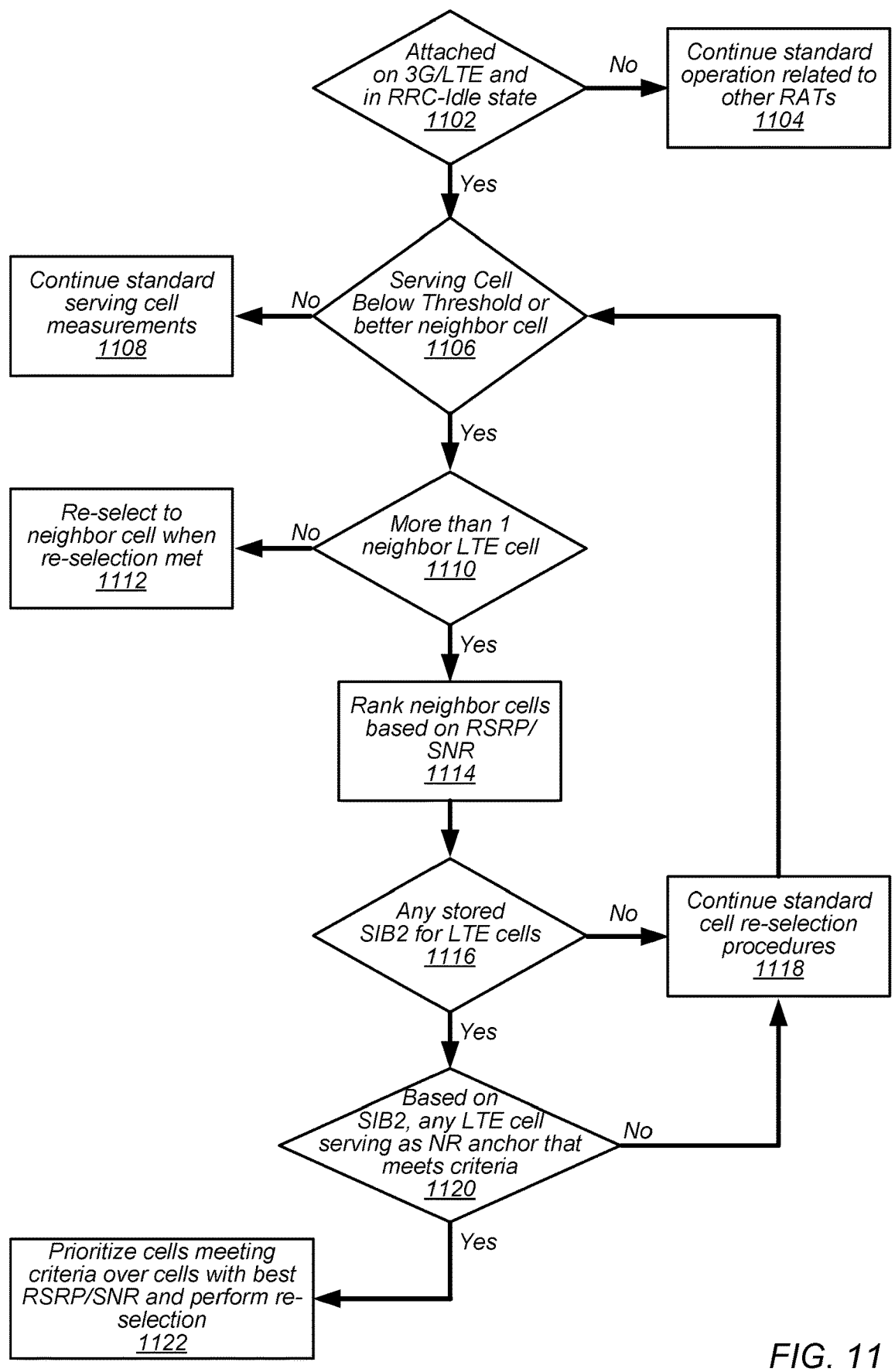

As another example, FIG. 11 illustrates an example of a flow diagram for a UE to prioritize cells based on an upper layer indication received for at least one of the cells during reselection, according to some embodiments. As noted, the method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a UE, such as UE 106, may determine whether it is attached to a 3G and/or LTE cell and in an RRC-idle state. In other words, the UE may determine whether it is in a state in which it may proceed with cell reselection.

At 1104, in response to determining that the UE is not attached to a 3G and/or LTE cell and in an RRC-idle state, the UE may continue with normal (e.g., standard) operations related to other radio access technologies (RATs).

Alternatively, at 1106, in response to determining that the UE is attached to a 3G and/or LTE cell and in an RRC-idle state, the UE may perform radio measurements of its serving cell as well as neighboring cells, e.g., inter-frequency, intra-frequency, and/or inter-RAT neighboring cells. The UE may determine, based on the performed radio measurements, whether the serving cell is below a threshold (e.g., associated with radio conditions) and/or whether neighboring cells may provide improved (e.g., better) radio conditions, e.g., as compared to the serving cell.

At 1108, in response to determining that neither condition is satisfied (e.g., the serving cell is not below a threshold (e.g., associated with radio conditions) and/or neighboring cells may not provide improved (e.g., better) radio conditions, e.g., as compared to the serving cell), the UE may continue normal (e.g., standard) operation and continue to perform serving cell and/or neighboring cell measurements.

Alternatively, at 1110, in response to determining that at least one of the conditions is satisfied (e.g., the serving cell is below a threshold (e.g., associated with radio conditions) and/or neighboring cells may provide improved (e.g., better) radio conditions, e.g., as compared to the serving cell), the UE may determine whether there are more than one neighboring LTE cells.

At 1112, in response to determining that there is only one neighboring LTE cell, the UE may reselect to a neighboring cell, e.g., when cell reselection criteria are met.

Alternatively, at 1114, in response to determining that there are more than one neighboring LTE cells, the UE may rank neighboring cells based on the radio measurements (e.g., such as RSRP and/or SNR). In other words, the UE may sort the LTE cells based on the performed radio measurements.

At 1116, the UE may determine whether any of the measured LTE cells have a stored version of a broadcasted SIB2. In other words, the UE may determine whether it has received a SIB2 from any of the measured (and subsequently ranked/sorted) LTE cells.

At 1118, in response to determining that the UE does not have any stored versions of broadcasted SIB2s from the measured LTE cells, the UE may continue with cell reselection based on the measured radio performance of the LTE cells.

Alternatively, at 1120, in response to determining that the UE does have at least one store version of a broadcasted SIB2 from the measured LTE cells, the UE may determine whether any of the measured LTE cells serve as an anchor to an NR cell (e.g., based on an upper layer indicator parameter included in the SIB2). In some embodiments, the UE may further determine whether any of the measured LTE cells serve as an anchor to an NR cell and meets one or more reselection criteria, such as being within a defined threshold of a highest ranked LTE cell based on the radio measurements and/or having an RSRP greater than a defined threshold. In some embodiments, the defined thresholds may be tuned to enhance performance and/or improve selection of LTE cells supporting EN-DC.

At 1122, in response to determining that at least one measured LTE cell serves as an anchor and meets any other selection criteria, the UE may prioritize the at least one measured LTE cell over LTE cells that may be ranked higher based on radio measurements and reselect to the at least one measured LTE cell. In some embodiments, such a prioritization may allow the UE to advantageously select LTE cells supporting EN-DC over LTE cells not supporting EN-DC.

Alternatively, in response to determining that there are no LTE cells that serve as an anchor and meet any other selection criteria, the UE may continue with cell reselection based on the measured radio performance of the LTE cells at 1118.

Figure 12:
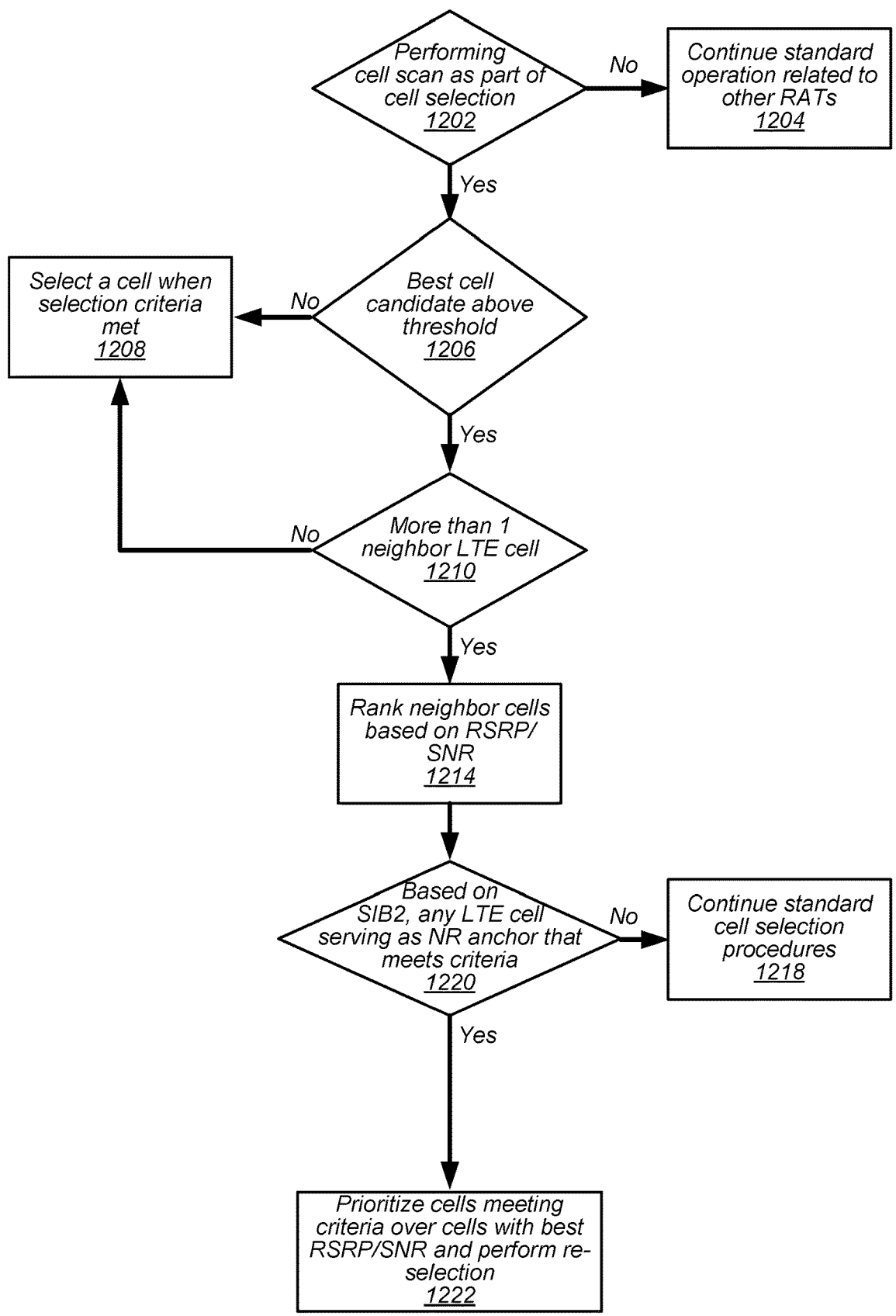

As another example, FIG. 12 illustrates an example of a flow diagram for a UE to prioritize cells based on an upper layer indication received for at least one of the cells during cell selection, according to some embodiments. As noted, the method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as UE 106, may determine whether it is performing a cell scan as part of cell selection. In some embodiments, the UE may determine whether it is performing a cell scan on an LTE frequency as part of cell selection. In some embodiments, the UE may be in an RRC-idle state during the scan.

At 1204, in response to determining that the UE is not performing a cell scan as part of cell selection, the UE may continue with normal (e.g., standard) operations related to other radio access technologies (RATs).

Alternatively, at 1206, in response to determining that the UE is performing a cell scan as part of cell selection, the UE may determine whether any candidate cells meets cell selection criteria.

At 1208, in response to determining that the condition is not satisfied (e.g., there are no candidate cells that meet cell selection criteria), the UE may continue normal (e.g., standard) operation and continue to scan for cells that meet cell selection criteria.

Alternatively, at 1210, in response to determining that there is at least one candidate cell that meets cell selection criteria, the UE may determine whether there is more than one cell that meets the cell selection criteria. In response to determining that there are no additional cells meeting the cell selection criteria, the method may continue at 1208 as described above.

At 1214, in response to determining that there is more than one cell that meets cell selection criteria, the UE may rank neighboring cells based on the radio measurements (e.g., such as RSRP and/or SNR). In other words, the UE may sort the cells based on the performed radio measurements.

At 1220, the UE may determine whether any of the measured cells serve as an anchor to an NR cell (e.g., based on an upper layer indicator parameter included in the SIB2). In some embodiments, the UE may further determine whether any of the measured cells serve as an anchor to an NR cell and meets one or more selection criteria, such as being within a defined threshold of a highest ranked cell based on the radio measurements and/or having an RSRP greater than a defined threshold. In some embodiments, the defined thresholds may be tuned to enhance performance and/or improve selection of cells supporting EN-DC.

At 1222, in response to determining that at least one measured cell serves as an anchor and meets any other selection criteria, the UE may prioritize the at least one measured cell over cells that may be ranked higher based on radio measurements and reselect to the at least one measured cell. In some embodiments, such a prioritization may allow the UE to advantageously select cells supporting EN-DC over TE cells not supporting EN-DC.

Alternatively, in response to determining that there are no cells that serve as an anchor and meet any other selection criteria, the UE may continue with cell selection based on the measured radio performance of the cells at 1218.

Figure 13:
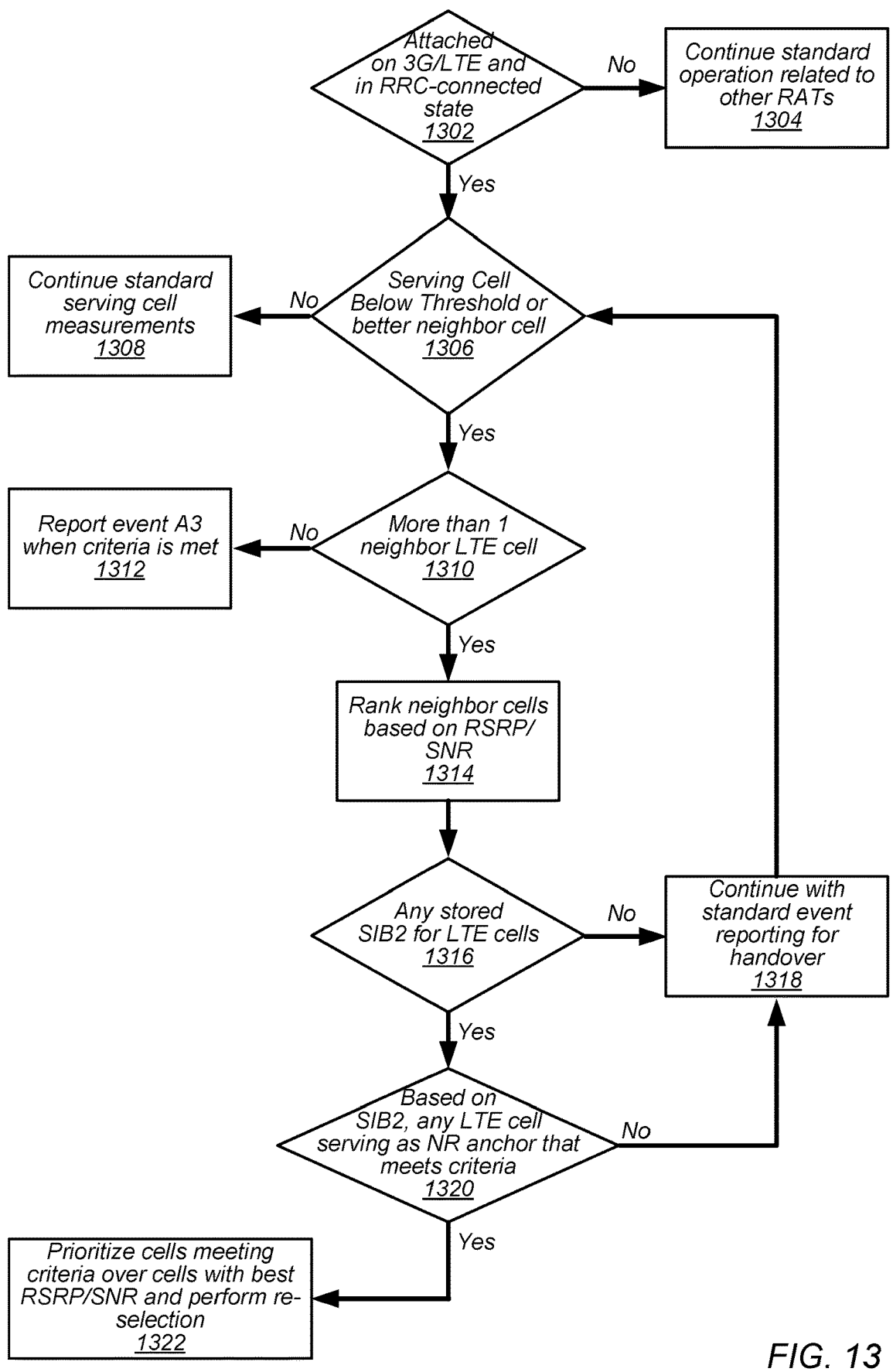

As a further example, FIG. 13 illustrates an example of a flow diagram for a UE to prioritize cells based on an upper layer indication received for at least one of the cells during reselection while the UE is in an RRC-connected state, according to some embodiments. As noted, the method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may determine whether it is attached to a 3G and/or LTE cell and in an RRC-connected state. In other words, the UE may determine whether it is in a state in which it may proceed with cell reselection.

At 1304, in response to determining that the UE is not attached to a 3G and/or LTE cell and in an RRC-connected state, the UE may continue with normal (e.g., standard) operations related to other radio access technologies (RATs).

Alternatively, at 1306, in response to determining that the UE is attached to a 3G and/or LTE cell and in an RRC-connected state, the UE may perform radio measurements of its serving cell as well as neighboring cells, e.g., inter-frequency, intra-frequency, and/or inter-RAT neighboring cells. The UE may determine, based on the performed radio measurements, whether the serving cell is below a threshold (e.g., associated with radio conditions) and/or whether neighboring cells may provide improved (e.g., better) radio conditions, e.g., as compared to the serving cell.

At 1308, in response to determining that neither condition is satisfied (e.g., the serving cell is not below a threshold (e.g., associated with radio conditions) and/or neighboring cells may not provide improved (e.g., better) radio conditions, e.g., as compared to the serving cell), the UE may continue normal (e.g., standard) operation and continue to perform serving cell and/or neighboring cell measurements.

Alternatively, at 1310, in response to determining that at least one of the conditions is satisfied (e.g., the serving cell is below a threshold (e.g., associated with radio conditions) and/or neighboring cells may provide improved (e.g., better) radio conditions, e.g., as compared to the serving cell), the UE may determine whether there are more than one neighboring LTE cells.

At 1312, in response to determining that there is only one neighboring LTE cell, the UE may report event A3, e.g., when cell reselection criteria are met.

Alternatively, at 1314, in response to determining that there are more than one neighboring LTE cells, the UE may rank neighboring cells based on the radio measurements (e.g., such as RSRP and/or SNR). In other words, the UE may sort the LTE cells based on the performed radio measurements.

At 1316, the UE may determine whether any of the measured LTE cells have a stored version of a broadcasted SIB2. In other words, the UE may determine whether it has received a SIB2 from any of the measured (and subsequently ranked/sorted) LTE cells.

At 1318, in response to determining that the UE does not have any stored versions of broadcasted SIB2s from the measured LTE cells, the UE may continue with cell reselection based on the measured radio performance of the LTE cells.

Alternatively, at 1320, in response to determining that the UE does have at least one store version of a broadcasted SIB2 from the measured LTE cells, the UE may determine whether any of the measured LTE cells serve as an anchor to an NR cell (e.g., based on an upper layer indicator parameter included in the SIB2). In some embodiments, the UE may further determine whether any of the measured LTE cells serve as an anchor to an NR cell and meets one or more reselection criteria, such as being within a defined threshold of a highest ranked LTE cell based on the radio measurements and/or having an RSRP greater than a defined threshold. In some embodiments, the defined thresholds may be tuned to enhance performance and/or improve selection of LTE cells supporting EN-DC.

At 1322, in response to determining that at least one measured LTE cell serves as an anchor and meets any other selection criteria, the UE may prioritize the at least one measured LTE cell over LTE cells that may be ranked higher based on radio measurements and reselect to the at least one measured LTE cell. In some embodiments, such a prioritization may allow the UE to advantageously select LTE cells supporting EN-DC over LTE cells not supporting EN-DC.

Alternatively, in response to determining that there are no LTE cells that serve as an anchor and meet any other selection criteria, the UE may continue with cell reselection based on the measured radio performance of the LTE cells at 1318.

Figure 14:
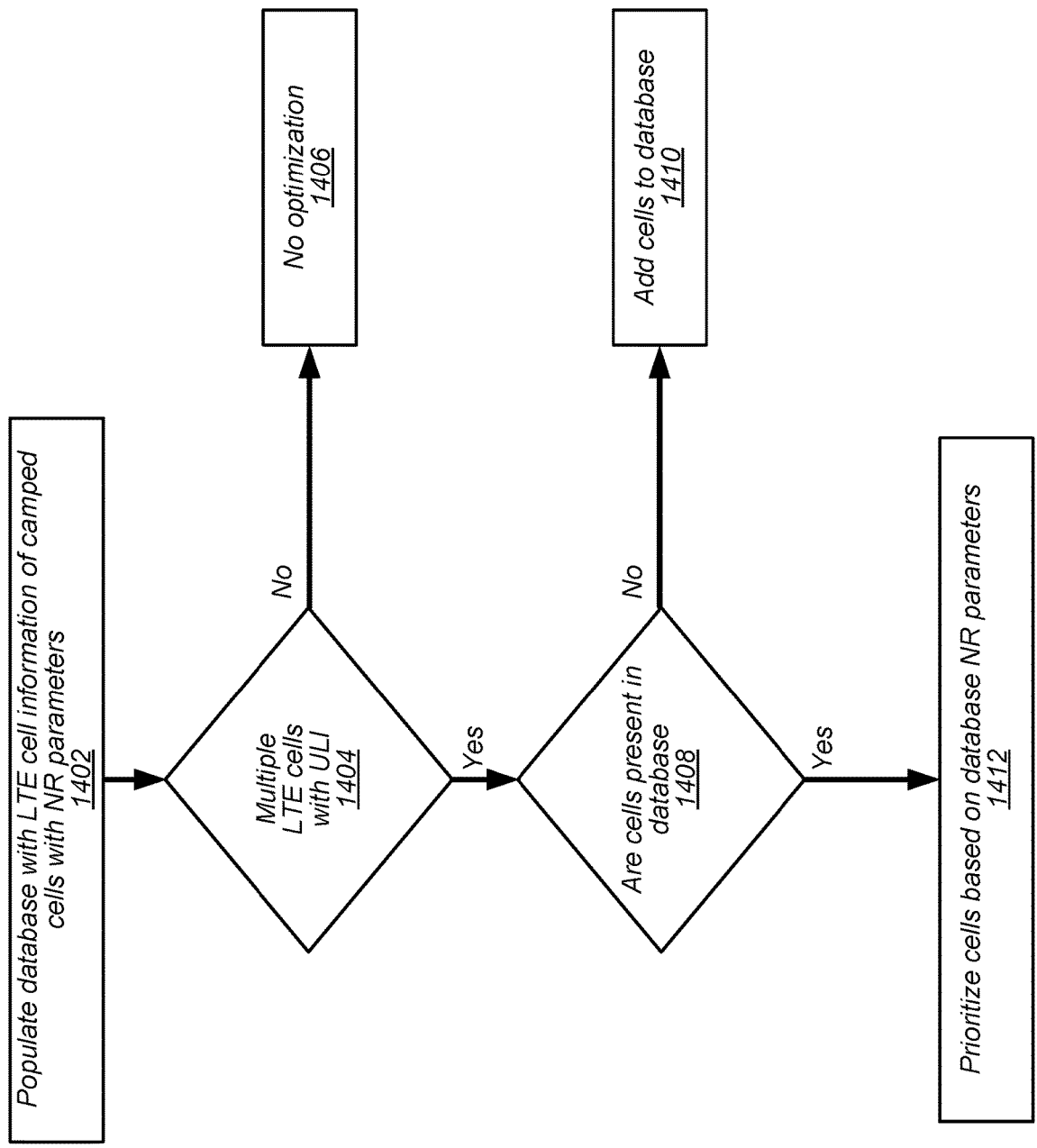

FIG. 14 illustrates an example of a flow diagram for a UE to prioritize LTE cells based on NR parameters included in an ULI, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a UE, such as UE 106, may populate a database (e.g., a data structure stored on the UE, such as a look up table), with LTE cell information of previously camped on cells, e.g., such as NR bands, SCS, BW, FR1, FR2, and so forth. In some embodiments, the database may be an EN-DC_db.

At 1404, the UE may determine whether more than two LTE cells have included a ULI in a SIB2 message.

At 1406, in response to determining that there are not more than two LTE cells that have included a ULI in a SIB2 message, no further optimization (e.g., sorting of LTE cells that have included a ULI in a SIB2 message) is necessary.

At 1408, in response to determining that there are more than two LTE cells that have included a ULI in a SIB2 message, the UE may determine whether the LTE cells are present in the database, e.g., the EN-DC_db.

At 1410, in response to determining that the LTE cells are not present in the database, the UE may add the cells to the database.

At 1412, in response to determining that the LTE cell are present in the database, the UE may prioritize the LTE cells in the database based, at least in part, on various NR parameters, such as one or more of NR bands, SCS, BW, FR1, FR2, and so forth.

In some embodiments, a UE, such as UE 106, may be a dual SIM device. In such embodiments, a first SIM (e.g., SIM1) may be data preferred and second SIM (e.g., SIM2) may be non-data preferred. In some embodiments, if (when) SIM2 detects an LTE cell which indicates the support of UpperLayerInd IE and if (when) SIM1 does not find an LTE cell with UpperLayerInd IE, then a baseband processor of the UE can recommend that an application processor of the UE to perform a data preference switch to SIM2. Such a switch may allow NR EN-DC to be activated (e.g., if change of cellular data preference switch consent is indicated by a user). In some embodiments, the UE may keep a data PDN context up on both the SIMs internally within the baseband processor and the application processor may select the IP context of an active data SIM's interface.

Figure 15:
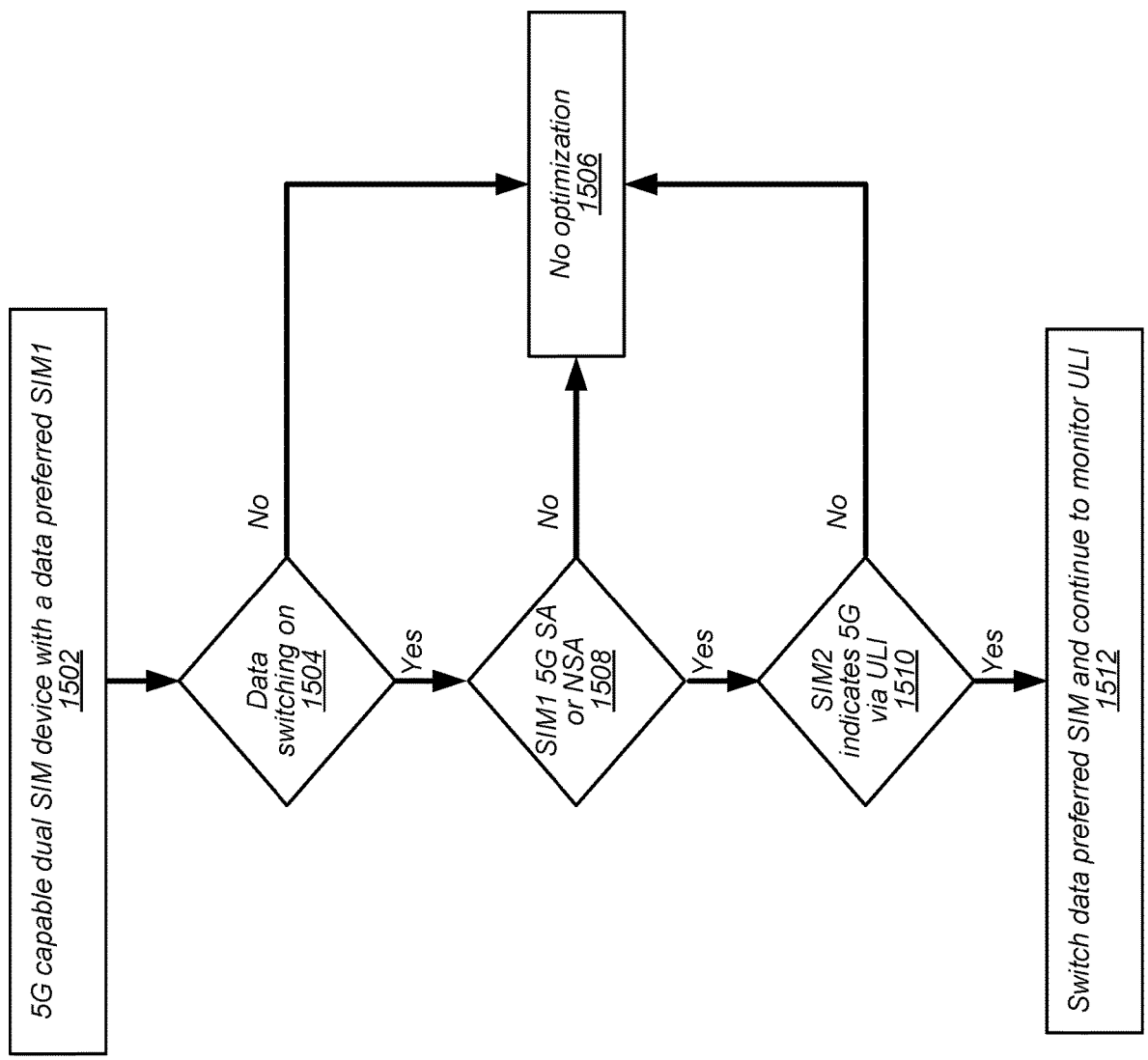

For example, FIG. 15 illustrates an example of a flow diagram for a dual SIM UE to prioritize SIMs based on a ULI in a SIB2, according to some embodiments. The method shown in FIG. 15 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a UE such as UE 106, may be a 5G capable dual SIM device with a data preferred SIM1. In other words, the UE may prefer to transmit data using first SIM over a second SIM.

At 1504, the UE may determine whether data switching is active, e.g., whether the UE can switch data preferences between a first SIM (e.g., SIM1) and a second SIM (e.g., SIM2).

At 1506, in response to determining that data switching is not active, the UE may continue to prefer SIM1 for data.

At 1508, in response to determining that data switching is active, the UE may determine whether SIM1 is 5G NR active, either in stand-alone or non-stand-alone mode. In response to determining that SIM1 is not 5G NR active, the UE may continue to prefer SIM1 for data at 1506.

At 1510, in response to determining that SIM1 is 5G NR active, the UE may determine whether SIM2 indicates presence of 5G NR via a ULI in a SIB2 broadcasted by an LTE cell. In response to determining that SIM2 does not indicate presence of 5G NR, the UE may continue to prefer SIM1 for data at 1506.

At 1512, in response to response to determining that SIM2 does indicate presence of 5G NR, the UE may switch SIM2 to data preferred SIM. Additionally, in some embodiments, the UE may continue to monitor ULI in SIB2 of SIM1. In some embodiments, the UE may switch SIM1 to data preferred SIM when UE receives a ULI in SIM2 of SIM1.

Figure 16:
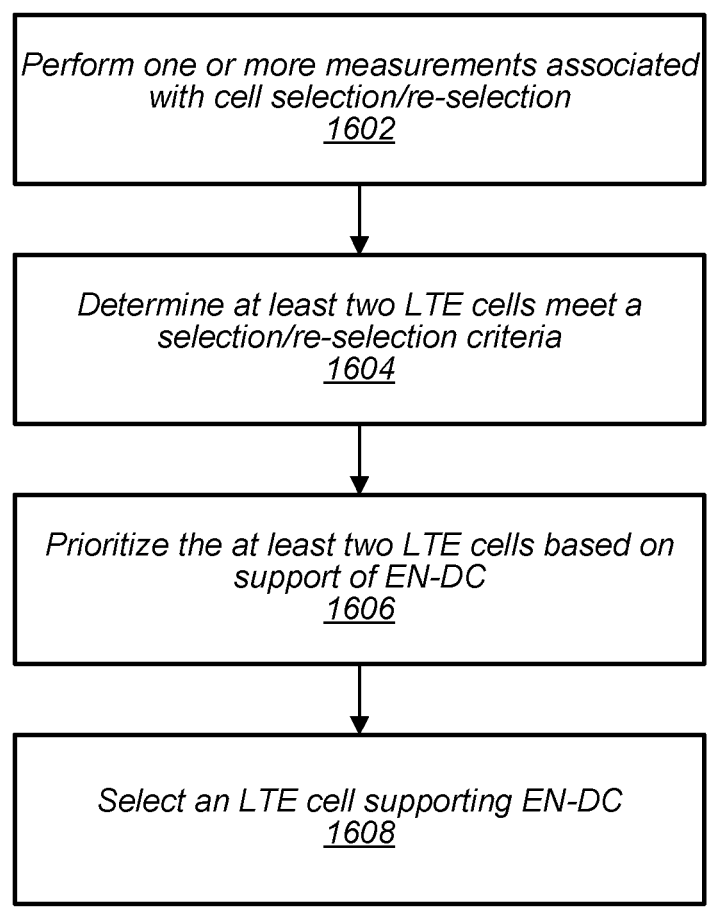
FIG. 16 illustrates an example of a flow diagram of a method for an assisted cell selection, according to some embodiments.

FIG. 16 illustrates an example of a flow diagram of a method for an assisted cell selection, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1602, a UE, such as UE 106, may perform one or more measurement scans associated with cell selection and/or cell re-selection.

At 1604, the UE may determine whether at least two Long Term Evolution (LTE) cells meet a selection criteria based on reference signal received power (RSPR) and/or signal to noise ratio (SNR) measurements.

At 1606, the UE may, in response to determining that at least two LTE cells meet the selection criteria, prioritize a first LTE cell of the at least two LTE cells over a second LTE cell of the at least two LTE cells based on support of Evolved Universal Terrestrial Radio Access (E-UTRA)—New Radio (NR) dual connectivity (EN-DC). In some embodiments, the first LTE cell may indicate support of EN-DC. In some embodiments, the second LTE cell may not indicate support of EN-DC. In some embodiments, the first LTE cell may be within a tolerance threshold of an RSRP and/or SNR of the second LTE cell. In some embodiments, the tolerance threshold may be an absolute threshold. In some embodiments, the tolerance threshold may be a percentage threshold. In some embodiments, prioritizing the first LTE cell over the second LTE cell based on support of EN-DC may further include confirming that a measured RSRP of the first LTE cell is greater than an RSRP threshold. In some embodiments, prioritizing the first LTE cell over the second LTE cell based on support of EN-DC may include determining that the first LTE cell is configured with NR neighbor cells and determining that the second LTE cell is not configured with NR neighbor cells. In some embodiments, prioritizing the first LTE cell over the second LTE cell based on support of EN-DC may include determining, based on historical information stored at the UE, that the first LTE cell was previously configured in EN-DC mode and determining, based on the historical information, that the second LTE cell was not previously configured in EN-DC mode.

At 1608, the UE may select the first LTE cell, e.g., for camping. In other words, the UE may prefer (and select) an LTE cell supporting EN-DC over an LTE cell not supporting EN-DC. In some embodiments, prioritizing the first LTE cell over the second LTE cell based on support of EN-DC may include receiving, from the first LTE cell, a first SIB2 that indicates support of EN-DC and receiving, from the second LTE cell, a second SIB2 that does not indicate support of EN-DC. In some embodiments, to indicate support of EN-DC, the first SIB2 includes an upper layer indicator (ULI) parameter (or information element) in a SIB2 and inclusion of the ULI parameter indicates support of EN-DC. In some embodiments, the UE may determine that the ULI parameter has a value equivalent to "True", thereby indicating support of EN-DC. In some embodiments, a value of "1" may indicate "True" and a value of "0" may indicate "False". In some embodiments, selecting the first LTE cell may include selecting the first LTE cell based on the first LTE cell indicating support of NR Frequency Range 1 (NR FR1). In some embodiments, selecting the first LTE cell may include selecting the first LTE cell based on the first LTE cell indicating support of NR Frequency Range 2 (FNR R2). In some embodiments, a SIB2 received from the first LTE cell may include an upper layer indicator (ULI) parameter indicating support of one or both of NR FR1 and/or NR FR2. In some embodiments, NR FR1 may include sub 6 GHz frequency bands and NR FR2 may include frequency bands from 24.25 GHz to 52.6 GHz. In some embodiments, selecting the first LTE cell may include selecting a sub-carrier spacing (SCS) from a plurality of SCSs of first LTE cell. In some embodiments, selecting the SCS may include selecting the SCS from the plurality of SCSs based, at least in part, on a type and latency of application that is requesting a radio resource control (RRC) connection, In some embodiments, selecting the SCS may include selecting the SCS from the plurality of SCSs based, at least in part, on whether the selection of the first LTE cell is for reachability purposes or for enhanced throughput purposes.

In some embodiments, the UE may store SCS as part of a cell harvesting procedure in an internal database. In some embodiments, the UE may upload and/or transmit the internal database to a server which serves as a crowd sourced database. In some embodiments, the server may be a device manufacturer owned server. In some embodiments, the UE may download and/or fetch the crowd sourced database. In such embodiments, the UE may store the crowd sourced database as the internal database. In some embodiments, the crowd sourced database may be downloaded/fetched over a non-cellular interface. In some embodiments, the non-cellular interface is one of a Wi-Fi interface or a Bluetooth interface.

In some embodiments, the UE may store, in a database, cell information for the first LTE cell, including one or more of NR frequency bands, NR sub-carrier spacing (SCS), NR bandwidths (BWs), NR Frequency Range 1 (NR FR1) support, and/or NR Frequency Range 2 (NR FR2) support. In some embodiments, the database may include an EN-DC_db.

In some embodiments, the UE may determine that it is operating in an NR stand-alone mode of operation. In such embodiments, cell selection or cell re-selection may include re-selection to an LTE cell from an NR cell.

In some embodiments, the UE may determine that it is operating in a non-stand-alone mode of operation. In such embodiments, cell selection and/or cell re-selection may include at least one of cell re-selection when the UE is in a radio resource control (RRC) idle state, cell selection when the UE is in an RRC idle state, cell re-selection when the UE is in an RRC inactive state, and/or cell selection when the UE experiences an LTE cell radio link failure. In some embodiments, when cell selection or cell re-selection includes cell selection when the UE is in an RRC idle state, prioritizing the first LTE cell over the second LTE cell based support of EN-DC may include confirming that a measured RSRP of the first LTE cell is greater than an RSRP threshold.

In some embodiments, the UE may include a first subscriber identity module (SIM) associated with the first LTE cell and a second SIM associated with the second LTE cell and the second SIM may be a data preferred SIM. In such embodiments, a data preference may be switched to the first SIM based on prioritizing the first LTE cell over the second LTE cell.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
one or more antennas;
one or more radios, configured to perform cellular communication using at least one radio access technology (RAT);
one or more processors coupled to the one or more radios, for performing voice and/or data communications;
wherein the one or more processors are configured to cause the UE to:
perform one or more measurement scans associated with cell selection or cell re-selection;
determine whether at least two Long Term Evolution (LTE) cells meet a selection criteria based on one or more of reference signal received power (RSRP) or signal to noise ratio (SNR) measurements;
in response to determining that at least two LTE cells meet the selection criteria, prioritize a first LTE cell of the at least two LTE cells over a second LTE cell of the at least two LTE cells based on support of Evolved Universal Terrestrial Radio Access (E-UTRA)—New Radio (NR) dual connectivity (EN-DC), wherein the first LTE cell indicates support of EN-DC, wherein the second LTE cell does not indicate support of EN-DC, and wherein the first LTE cell is within a tolerance threshold of an RSRP and/or an SNR of the second LTE cell; and
select the first LTE cell based on the first LTE cell indicating support of at least one of NR Frequency Range 1 (NR FR1) or NR Frequency Range 2 (NR FR 2), wherein a first system information block (SIB) type 2 (SIB2) received from the first LTE cell comprises an upper layer indicator (ULI) indicating support of NR FR1 and/or NR FR2, and wherein NR FR1 includes a sub 6 GHz frequency band and NR FR2 includes a frequency band between 24.25 GHz and 52.6 GHz.

2. The UE of claim 1,
wherein, to prioritize the first LTE cell over the second LTE cell based on support of EN-DC, the one or more processors are further configured to cause the UE to:
receive, from the first LTE cell, the first SIB2 that indicates support of EN-DC; and
receive, from the second LTE cell, a second SIB2 that does not indicate support of EN-DC; and
wherein, to indicate support of EN-DC, the first SIB2 includes the ULI.

3. The UE of claim 2,
wherein the one or more processors are further configured to cause the UE to:
determine that the ULI has a value equivalent to "True", thereby indicating support of EN-DC, wherein a value of "1" indicates "True" and a value of "0" indicates "False".

4. The UE of claim 1,
wherein the one or more processors are further configured to cause the UE to:
store, in a database, cell information for the first LTE cell, including one or more of NR frequency bands, NR sub-carrier spacing (SCS), NR bandwidths (BWs), NR FR1 support, or NR FR2 support, wherein the database comprises an EN-DC_db.

5. The UE of claim 1,
wherein the one or more processors are further configured to cause the UE to:
determine whether the UE is operating in a NR stand-alone mode of operation or a non-stand-alone mode of operation; and
wherein, when the UE is operating in the NR stand-alone mode of operation, cell selection or cell re-selection includes re-selection to an LTE cell from an NR cell; and
wherein, when the UE the UE is operating in a non-stand-alone mode of operation, cell selection or cell re-selection includes at least one of:
cell re-selection when the UE is in a radio resource control (RRC) idle state;
cell selection when the UE is in an RRC idle state;
cell re-selection when the UE is in an RRC inactive state; or
cell selection when the UE experiences an LTE cell radio link failure.

6. The UE of claim 1,
wherein, when cell selection or cell re-selection includes cell selection when the UE is in an RRC idle state, to prioritize the first LTE cell of the at least two LTE cells over the second LTE cell of the at least two LTE cells based on support of EN-DC, the one or more processors are further configured to cause the UE to:
confirm that a measured RSRP of the first LTE cell is greater than an RSRP threshold.

7. The UE of claim 1,
wherein the UE further comprises:
a first subscriber identity module (SIM) associated with the first LTE cell; and
a second SIM associated with the second LTE cell;
wherein the second SIM is a data preferred SIM; and
wherein data preference is switched to the first SIM based on prioritizing the first LTE cell over the second LTE cell.

8. The UE of claim 1,
wherein, to prioritize the first LTE cell over the second LTE cell based on support of EN-DC, the one or more processors are further configured to cause the UE to:
determine that the first LTE cell is configured with NR neighbor cells; and
determine that the second LTE cell is not configured with NR neighbor cells.

9. The UE of claim 1,
wherein, to prioritize the first LTE cell over the second LTE cell based on support of EN-DC, the one or more processors are further configured to cause the UE to:
determine, based on historical information stored at the UE, that the first LTE cell was previously configured in EN-DC mode; and
determine, based on the historical information, that the second LTE cell was not previously configured in EN-DC mode.

10. The UE of claim 1,
wherein, to select the first cell, the one or more processors are further configured to cause the UE to select a sub-carrier spacing (SCS) from a plurality of SCSs of the first cell based, at least in part, on at least one of a type and latency of application that is requesting a radio resource control (RRC) connection, whether the selection of the first cell is for reachability purposes, or whether the selection of the first cell is for enhanced throughput purposes.

11. An apparatus, comprising:
a memory; and
a processor in communication with the memory, wherein the processor is configured to:
perform one or more measurement scans associated with cell selection or cell re-selection;
determine whether at least two cells meet a selection criteria based on one or more of reference signal received power (RSRP) or signal to noise ratio (SNR) measurements;
in response to determining that at least two cells meet the selection criteria, prioritize a first cell of the at least two cells over a second cell of the at least two cells based on support of a dual connectivity mode of operation, wherein the first cell indicates support of the dual connectivity mode of operation, wherein the second cell does not indicate support of the dual connectivity mode of operation, and wherein the first cell is within a tolerance threshold of an RSRP and/or an SNR of the second cell; and
select the first cell based on the first cell indicating support of at least one of NR Frequency Range 1 (NR FR1) or NR Frequency Range 2 (NR FR 2), wherein a system information block (SIB) type 2 (SIB2) received from the first cell comprises an upper layer indicator (ULI) indicating support of NR FR1 and/or NR FR2, and wherein NR FR1 includes a sub 6 GHz frequency band and NR FR2 includes a frequency band between 24.25 GHz and 52.6 GHz.

12. The apparatus of claim 11,
wherein, to select the first cell, the processor is further configured to select a sub-carrier spacing (SCS) from a plurality of SCSs of the first cell.

13. The apparatus of claim 12,
wherein, to select the SCS, the processor is further configured to select the SCS from the plurality of SCSs based, at least in part, on at least one of a type and latency of application that is requesting a radio resource control (RRC) connection, whether the selection of the first cell is for reachability purposes, or whether the selection of the first cell is for enhanced throughput purposes.

14. The apparatus of claim 12,
wherein the processor is further configured to:
- store the SCS as part of a cell harvesting procedure in an internal database; and
- generate instructions to upload and/or transmit the internal database to a server which serves as a crowd sourced database, wherein the server is a device manufacturer owned server.

15. The apparatus of claim 11,
wherein the processor is further configured to:
- download and/or fetch a crowd sourced database from a server, wherein the crowed sourced database includes cell information for the at least two cells, and wherein the cell information includes one or more of New Radio (NR) frequency bands, NR sub-carrier spacing (SCS), NR bandwidths (BWs), NR FR1 support, or NR FR2 support; and
- store the crowd sourced database as an internal database.

16. The apparatus of claim 15,
wherein the crowd sourced database is downloaded/fetched over a non-cellular interface.

17. A non-transitory computer readable memory medium storing program instructions executable by processing circuitry to cause a user equipment device (UE) to:
- determine whether at least two cells meet a selection criteria based on one or more measurement scans associated with cell selection or cell re-selection;
- in response to determining that at least two LTE cells meet the selection criteria, prioritize a first cell of the at least two cells over a second cell of the at least two cells based on support of Evolved Universal Terrestrial Radio Access (E-UTRA)—New Radio (NR) dual connectivity (EN-DC), wherein the first cell indicates support of EN-DC, wherein the second cell does not indicate support of EN-DC, and wherein the first cell is within a tolerance threshold of the second cell; and
- select the first cell based on the first cell indicating support of at least one of NR Frequency Range 1 (NR FR1) or NR Frequency Range 2 (NR FR 2), wherein a system information block (SIB) type 2 (SIB2) received from the first cell comprises a first upper layer indicator (ULI) indicating support of NR FRI and/or NR FR2, and wherein NR FRI includes a sub 6 GHz frequency band and NR FR2 includes a frequency band between 24.25 GHz and 52.6 GHz.

18. The non-transitory computer readable memory medium of claim 17,
wherein, to prioritize the first cell over the second cell based on support of EN-DC, the program instructions are further executable to cause the UE to:
- receive, from the first cell, the first SIB2 that indicates support of EN-DC; and
- receive, from the second cell, a second SIB2 that does not indicate support of EN-DC; and
wherein, to indicate support of EN-DC, the first SIB2 includes the ULI.

19. The non-transitory computer readable memory medium of claim 17,
wherein the program instructions are further executable to cause the UE to:
- store, in a database, cell information for the first cell, including one or more of NR frequency bands, NR sub-carrier spacing (SCS), NR bandwidths (BWs), NR FR1, or NR FR2 support.

20. The non-transitory computer readable memory medium of claim 17,
wherein the tolerance threshold is one of an absolute threshold or a percentage threshold.

* * * * *